United States Patent
Chaudhuri et al.

(10) Patent No.: US 10,237,197 B2
(45) Date of Patent: Mar. 19, 2019

(54) SYSTEM AND METHOD FOR PROCESSING DATA PACKETS FOR TRANSMISSION IN A WIRELESS COMMUNICATION NETWORK

(71) Applicant: Wipro Limited, Bangalore (IN)

(72) Inventors: Saptarshi Chaudhuri, Bangalore (IN); Avijit Manna, Kolkata (IN); Amartya Kumar Das, Kolkata (IN)

(73) Assignee: Wipro Limited, Bangalore (IN)

( * ) Notice: Subject to any disclaimer, the term of this patent is extended or adjusted under 35 U.S.C. 154(b) by 112 days.

(21) Appl. No.: 15/459,346

(22) Filed: Mar. 15, 2017

(65) Prior Publication Data

US 2018/0219789 A1 Aug. 2, 2018

(30) Foreign Application Priority Data

Jan. 31, 2017 (IN) .............................. 201741003636

(51) Int. Cl.

| | |
|---|---|
| *H04W 40/00* | (2009.01) |
| *H04L 12/823* | (2013.01) |
| *H04L 12/833* | (2013.01) |
| *H04L 12/801* | (2013.01) |
| *H04L 29/06* | (2006.01) |
| *H04W 28/06* | (2009.01) |
| *H04L 12/841* | (2013.01) |
| *H04W 28/02* | (2009.01) |
| *H04L 12/851* | (2013.01) |
| *H04L 12/835* | (2013.01) |

(52) U.S. Cl.
CPC .............. *H04L 47/32* (2013.01); *H04L 47/28* (2013.01); *H04L 47/31* (2013.01); *H04L 47/34* (2013.01); *H04L 69/28* (2013.01); *H04W 28/06* (2013.01); *H04L 47/24* (2013.01); *H04L 47/30* (2013.01); *H04W 28/0268* (2013.01)

(58) Field of Classification Search
None
See application file for complete search history.

(56) References Cited

U.S. PATENT DOCUMENTS

| | | | | |
|---|---|---|---|---|
| 2010/0135202 A1* | 6/2010 | Chun | .................... | H04L 1/1877 370/328 |
| 2015/0078339 A1* | 3/2015 | Ohta | .................... | H04W 36/02 370/331 |
| 2017/0105227 A1* | 4/2017 | Pinheiro | ........... | H04W 28/0263 |

OTHER PUBLICATIONS

Qian et al., "A Super Base Station Based Centralized Network Architecture for 5G Mobile Communication Systems", Science Direct, 2015, pp. 152-159.

(Continued)

*Primary Examiner* — Sithu Ko
(74) *Attorney, Agent, or Firm* — LeClairRyan PLLC

(57) ABSTRACT

This disclosure relates generally to communication network, and more particularly to a system and method for processing data packets for transmission in a wireless communication network. In one embodiment, a method is provided for processing data packets for transmission in a wireless communication network. The method comprises dynamically creating a plurality of data packet discard groups (DPDG's), determining a plurality of simultaneously active data packet transmission protocol (DPTP) packet discard timers (DPDT's) corresponding to the plurality of DPDG's, and assigning each of the plurality of simultaneously active DPDT's to each of the plurality of DPDG's. Each of the created plurality of DPDG's comprises a plurality of data packets.

18 Claims, 9 Drawing Sheets

(56) References Cited

OTHER PUBLICATIONS

Digital Cellular Telecommunications System (Phase 2+); Universal Mobile Telecommunications System (UTMS); LTE, Policy and Charging Control Architecture (3GPP TS 23.203 Version 12.6.0 Release 12), European Telecommunications Standards Institute 2014.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description, Stage 2, (Release 14), 3GPP Organizational Partners, 2017.
3rd Generation Partnership Project; Technical Specification Group Radio Access Network; Evolved Universal Terrestrial Radio Access (E-UTRA); Radio Link Control (RLC) Protocol Specification (Release 14), 3GPP Organizational Partners, 2017.
3rd Generation Partnership Project; Technical Specification Group Radio Access Network; Evolved Universal Terrestrial Radio Access (E-UTRA); Packet Data Convergence Protocol (PDCP) Specification (Release 14), 3GPP Organizational Partners, 2017.
3rd Generation Partnership Project; Technical Specification Group Services and System Aspects; General Packet Radio Service (GPRS) Enhancements for Evolved Universal Terrestrial Radio Access Network (E-UTRAN); (Release 14), 3GPP Organizational Partners, 2017.

\* cited by examiner

SYSTEM AND METHOD FOR PROCESSING DATA PACKETS FOR TRANSMISSION IN A WIRELESS COMMUNICATION NETWORK

This application claims the benefit of Indian Patent Application Serial No. 201741003636, filed Jan. 31, 2017, which is hereby incorporated by reference in its entirety.

FIELD

This disclosure relates generally to communication network, and more particularly to a system and method for processing data packets for transmission in a wireless communication network.

BACKGROUND

Mobile devices have become ubiquitous in today's world and are increasingly used to access various communication services (e.g., voice calls, video calls, messaging, streaming multimedia content, playing high definition online games, and so forth) over wireless communication networks. A wireless communications network may include a number of base stations (BS's), each supporting communication for a number of mobile devices or user equipment (UE's). A UE may communicate with a BS during downlink and uplink, using various transmission protocols. The downlink (or forward link) refers to the communication link from the BS to the UE, and the uplink (or reverse link) refers to the communication link from the UE to the BS. Further, the wireless communication networks may correspond to multiple-access networks capable of supporting multiple users (i.e., UE's) by sharing the available network resources (e.g., time, frequency, and power). For example, conventional third generation (3G) and fourth generation (4G) wireless communication networks employ various multiple access techniques, such as code division multiple access (CDMA) in 3G, and frequency division multiple access (FDMA) or time division multiple access (TDMA) in 4G.

A long term evolution (LTE) network is a 4G wireless communication network, and is an end to end Internet protocol (IP) network supporting only packet switching. LTE network provides for high sector capacity, improved end-user throughputs, and reduced user plane latency. It therefore provides for significantly improved user experience along with greater mobility. The LTE network includes a number of 4G enable UE's, a number of evolved Node B's (eNB's) as base stations, and an evolved packet core (ePC). The user's application data (UAD) are transmitted over Ethernet channels between the ePC and the eNB's, and over air interface between the eNB's and the UE's. The data packets are transmitted between the UE's and the eNB's in downlink as well as in uplink using a data packet transmission protocol known as packet data convergence protocol (PDCP), as well as using various other protocols such as radio link control (RLC) protocol, medium access control (MAC) protocol, and so forth. For example, the downlink (DL) data packets flow through the PDCP, RLC and MAC protocol handlers within the eNB while the uplink (UL) data packets flow through the PDCP, RLC and MAC protocol handlers within the UE.

The DL data packets is received at the PDCP handler in the eNB from the ePC (i.e., from a signaling gateway (SGW) in the ePC through a gateway tunneling protocol (GTP-U)). The PDCP handler stores these data packet in PDCP transmission buffers (PTB's), and then sends them to the RLC handler after processing the data packets, if configured, for integrity protection and for ciphering. The received data packets are maintained in a first in first out (FIFO) queue in RLC transmit buffers (RTB's) at the RLC handler. The RLC handler then informs the MAC handler regarding its transmission buffer size by sending an internal control message (ICM) such as MAC status request. In turn, the MAC handler provides the RLC handler with its current available capacity information by sending transmission opportunity message (MAC status indication). The RLC handler then compiles the data packets from one or more buffers (queues) based on the transmission opportunity information. The compilation may involve concatenation and/or segmentation along with header addition. The RLC handler then sends the compiled message as MAC data request to the MAC handler by putting the compiled message into the MAC queue. Finally, the MAC handler processes the data packets and send it to radio subsystem of the ENB for air transmission.

It should be noted that each radio bearer (RB) has its own quality of service (QoS) requirements (e.g. time delay budget is one such QoS requirement). Due to such requirement, if the received data packets in DL at the eNB can't be transmitted to the UE in a reasonable time frame, it may be too late for a receiver application at the UE to accept the incoming data packets. In such a scenario, retransmission may occur at an application level. Thus, the PDCP handler in the eNB starts a timer for each received packet in DL so as to maintain the time delay budget for each data packet in the RB. This timer is known as a PDCP discard timer (PDT).

Thus, whenever data packets arrive at the PDCP handler from the SGW via GTP-U, the PDCP handler stores the data packets in the PTB and starts a PDT with expiry value depending on factors like user specific QoS and/or service specific QoS, for each received packet. The PDCP handler then sends the data packets to the RLC handler after making the data packets integrity protected and ciphered, if the PDCP handler is so configured. On expiry of the PDT, the PDCP handler discards or clears the corresponding data packet from the PTB, and sends the ICM to indicate the RLC handler that the particular packet is deleted from the PTB, and there is no need to transmit the data packet. Additionally the PDCP handler informs the RLC about the discarded packet sequence number through the ICM. The RLC then deletes corresponding packet from its buffer if it is not transmitted already. As will be appreciated, a similar operation may be performed at the UE during uplink.

However, incoming data rate at the PDCP handler may be variable for different users based on service usage and the corresponding QoS. Additionally, for downlink, incoming data rate at the PDCP handler may also depend on the number of active users under the coverage area of the eNB. Thus, operational load of UE (UOL) or operational load of eNB (EOL) varies dynamically. For example, for each received packet and on expiry of PDT, sending ICM to indicate the RLC handler for discarding of that particular packet adds to significant processing overhead. The processing overhead further compounds as there may be possibility of accumulation of too many timer expiry at a given moment pending packet discard. The processing of such pending packet discard may take longer, where further PDT's may get expired adding to the pending list of packet discard.

The PDCP handler may get clogged by the pending packet discard waiting to happen. This may result in the PDCP and the RLC buffer overflow. This may further prevent the PDCP handler to accept the newly arrived data packets due to buffer overflow. The overhead of accumulated packet discard at the PDCP handler, eventually leads to delay in handling packets discards for the subsequent PDT expiry. If the delay is larger than the delay budget for a data packet, then it may be possible that the data packet may be transmitted beyond an acceptable time-window (i.e., delay budget). Thus, it may be too late for a receiver application at the UE or a receiver application at the eNB to accept the incoming packet. In a typical eNB or UE, the PDCP buffer length is high. In some cases, at full load, the number of active PDT's for all pending discard-packets may be equal to the length of the buffer. Also, sending ICM to the RLC handler for each of these discarded packets is process and resource intensive. This may further add to processing overhead for the eNB or the UE. All such scenarios may lead to degradation of the service quality at the UE. Also, transferring packets too late to the UE or the eNB may be unnecessary, leading to bandwidth waste on air interface and packet discard overhead for the eNB or the UE.

Current techniques try to address the processing overhead issues for the data packet transmission in the eNB by reducing the ICM (e.g MAC-Status-Request) between PDCP handler and other downlink handlers (for example RLC & MAC). However, current techniques fail to provide handling of large number PDTs and their expiry to address the processing overload issue. Further, cloud radio access network (C-RAN) comprises of multiple eNB's. A centralized baseband unit (C-BBU) of C-RAN represent the base band part of these constituent eNB's. In the context of user packet transmission (i.e., data packet transmission in downlink) in case of CBBU, if there is a collapsed PDCP and a collapsed RLC, the above mentioned issues are further aggravated.

SUMMARY

In one embodiment, a method for processing data packets for transmission in a wireless communication network is disclosed. In one example, the method comprises dynamically creating a plurality of data packet discard groups (DPDG's). Each of the created plurality of DPDG's comprises a plurality of data packets. The method further comprises determining a plurality of simultaneously active data packet transmission protocol (DPTP) packet discard timers (DPDT's) corresponding to the plurality of DPDG's. The method further comprises assigning each of the plurality of simultaneously active DPDT's to each of the plurality of DPDG's.

In one embodiment, a system for processing data packets for transmission in a wireless communication network is disclosed. In one example, the system comprises at least one processor and a memory communicatively coupled to the at least one processor. The memory stores processor-executable instructions, which, on execution, cause the processor to dynamically create a plurality of data packet discard groups (DPDG's). Each of the created plurality of DPDG's comprises a plurality of data packets. The processor-executable instructions, on execution, further cause the processor to determine a plurality of simultaneously active data packet transmission protocol (DPTP) packet discard timers (DPDT's) corresponding to the plurality of DPDG's. The processor-executable instructions, on execution, further cause the processor to assign each of the plurality of simultaneously active DPDT's to each of the plurality of DPDG's.

In one embodiment, a non-transitory computer-readable medium storing computer-executable instructions for processing data packets for transmission in a wireless communication network is disclosed. In one example, the stored instructions, when executed by a processor, cause the processor to perform operations comprising dynamically creating a plurality of data packet discard groups (DPDG's). Each of the created plurality of DPDG's comprises a plurality of data packets. The operations further comprise determining a plurality of simultaneously active data packet transmission protocol (DPTP) packet discard timers (DPDT's) corresponding to the plurality of DPDG's. The operations further comprise assigning each of the plurality of simultaneously active DPDT's to each of the plurality of DPDG's.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
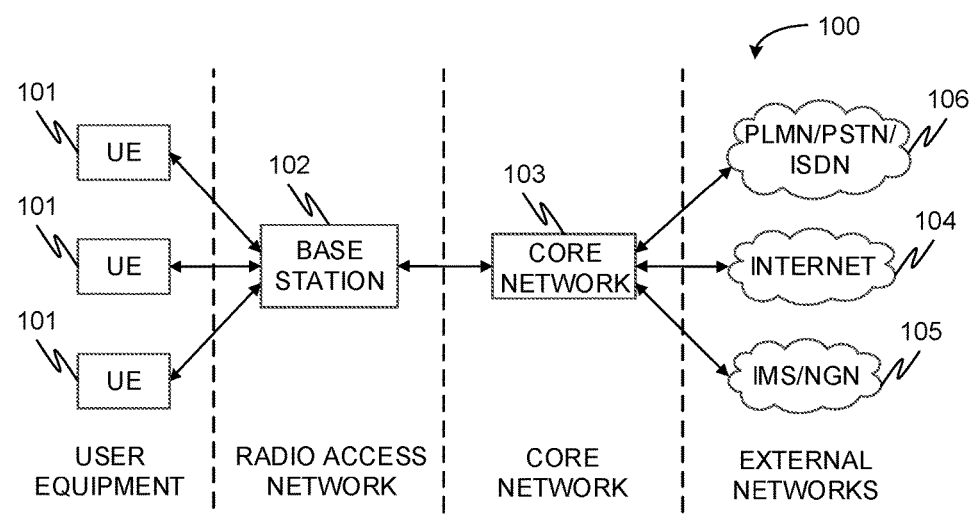
FIG. 1 illustrates an exemplary communication network architecture in which various embodiments of the present disclosure may function.

Referring now to FIG. 1, an exemplary communication network architecture in which various embodiments of the present disclosure may function is illustrated. The communication network 100 may include one or more user equipment (UE's) 101 communicating wirelessly with various radio access networks. Examples of a UE 101 may include, but are not limited to, a cell phone, a smart phone, a tablet, a phablet, and a laptop. For purpose of illustration, the various radio access networks include, but are not limited to, a GSM EDGE radio access network (GERAN), a UMTS terrestrial radio access network (UTRAN), an evolved UMTS terrestrial radio access network (E-UTRAN), an improved E-UTRAN, and a new radio access networks. Each of the radio access networks include a number of base stations (BS) 102, each supporting communication for a number of UE's 101 in its coverage area. It should be noted that the coverage area of a BS 102 may be divided into sectors that constitute only a portion of the total coverage area of all the base stations combined. Further, it should be noted that there may be overlapping coverage areas for different radio access networks employing different technologies. A base transceiver station (BTS) and a base station controller (BSC) form the BS 102 for GERAN while a Node B and a radio network controller (RNC) form the BS 102 for UTRAN. Similarly, evolved Node B (eNodeB or eNB) acts as the BS 102 for E-UTRAN i.e., long term evolution (LTE) network, while an improved eNB may act as the BS 102 for improved E-UTRAN i.e., advance LTE. The depicted radio access networks are merely exemplary, and thus it will be understood that the teachings of the disclosure contemplate other existing wireless radio access networks (e.g., worldwide interoperability for microwave access (WiMAX) network, High Speed Packet Access (3GPP's HSPA) network, and so forth) or any new wireless radio access networks that may provide for processing of data packets for transmission, in accordance with embodiments of the present disclosure.

Each of the radio access networks may be communicatively coupled with a respective core network, which in turn may communicate with external networks (packet switched networks or circuit switched networks). The core network 103 may include a packet core network which in turn may be communicatively coupled with external packet switched networks (e.g., Internet 104, IP multimedia subsystem (IMS) network 105, or a next generation network (NGN) 105, etc.) or a circuit switched core network which in turn may communicate with external circuit switched networks (e.g., public land mobile network (PLMN) 106, public switched telephone network (PSTN) 106, integrated service digital network (ISDN) 106, etc).

For example, the GERAN and the UTRAN communicate with a circuit switched core network comprising mobile services switching center (MSC), gateway MSC (GMSC), home location register or visitor location register (HLR/VLR). The MSC and GMSC serve the UE 101 in its current location for circuit switched services and are responsible for the interworking with external circuit switched networks. In some embodiments, the MSC and GMSC also interwork with external packet switched networks, such as IP multimedia subsystem (IMS) network. For example, the MSC may connect to a media gateway (MGW) of the IMS network. The HLR/VLR is a mobile operator database accessible by MSC and which includes information with respect to users such as phone number, location within home/visiting network, and so forth. Further, the GERAN and the UTRAN also communicate with a packet core that includes serving GPRS support node (SGSN) and gateway GPRS support node (GGSN). As will be appreciated by those skilled in the art, a general packet radio service (GPRS) is a packet-oriented mobile data service that enables 2G and 3G cellular networks to transmit IP packets to external networks such as the Internet. The SGSN is a component of the GPRS network that handles functions related to packet switched data within the network such as packet routing and transfer, mobility management, charging data, authentication of the users, and so forth. Similarly, GGSN is another component of the GPRS network and is responsible for the interworking between the GPRS network and external packet switched networks, such as Internet or IMS network.

Similarly, E-UTRAN communicates with an evolved packet core (EPC) that includes a mobility management entity (MME), a serving gateway (SGW), a packet data network gateway (PGW), a policy control and charging rules function (PCRF), and a Home Subscriber Server (HSS). The MME may be responsible for evolved packet system (EPS) session management (ESM), EPS mobility management (EMM), EPS connection management (ECM), non-access stratum, ciphering and integrity protection, inter core network signaling, system architecture evolution (SAE) bearer control, handover, and so forth. The combined functionalities of the SGW and the PGW may include lawful interception (LI), packet routing and forwarding, transport level packet marking in the uplink and the downlink, accounting on user, packet filtering, mobile IP, policy enforcement, and so forth. The PGW further connects the EPC with external packet switched networks such as the Internet or NGN. The PCRF is responsible for policy enforcement decisions as well as for charging functionalities. The HSS is a master user database containing user subscription related information such as user identification, user profile, and so forth. The HSS performs authentication and authorization of the user, and so forth.

The NGN 105 or IMS network 105 may include a node (e.g., media gateway controller (MGC) in case of the NGN, or a serving—call session control function (S-CSCF) in case of the IMS networks) that anchors the session and is responsible for session management, routing and control. Additionally, the node may be responsible for control and management of media servers. The NGN 105 or IMS network 105 may further include a media gateway (MGW) that enables multimedia communications across packet-switched and circuit-switched networks by performing conversions between different transmissions and coding techniques. In some embodiments, the NGN 105 or IMS network 105 may also include a signalling gateway that may be used for performing interworking between signalling protocols such as signalling system 7 (SS7) when connecting to PSTN/PLMN networks 106 and IP-based signalling protocols such as SIGTRAN which is supported by the node. It should be noted that, in some embodiments, the NGN 105 or IMS network 105 may also access and use the HSS.

The description below describes an LTE network for purposes of example, and LTE terminologies are used in much of the description below. However, as stated above the techniques are applicable beyond LTE networks. Thus, for example, the techniques may be applicable to any wireless communication networks (e.g., GERAN, UTRAN, improved E-UTRAN, etc.) that employ data packet transmission. Further, the description below describes a packet data convergence protocol (PDCP) employed by UMTS/LTE network for purposes of example, and PDCP terminologies are used in much of the description below. However, the techniques are applicable to any data packet transmission protocols (DPTP's) (e.g., packet data protocol (PDP) for GPRS/HSPA network) with a corresponding data packet discard timers (DPDT's) that may be employed for data packet transmission in a wireless communication network. Moreover, the description below describes downlink process (i.e., data transmission from base station to UE) for purposes of example, and downlink terminologies and examples are used in much of the description below. However, the techniques are equally applicable for uplink process (i.e., data transmission from UE to base station). In some embodiments, the configuration parameters for uplink data transmission may be provided by the base station (e.g., eNB, Node B, etc.) to the user equipment (UE) which would then process the data packets for uplink data transmission similar to the techniques described for the downlink process.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 2:
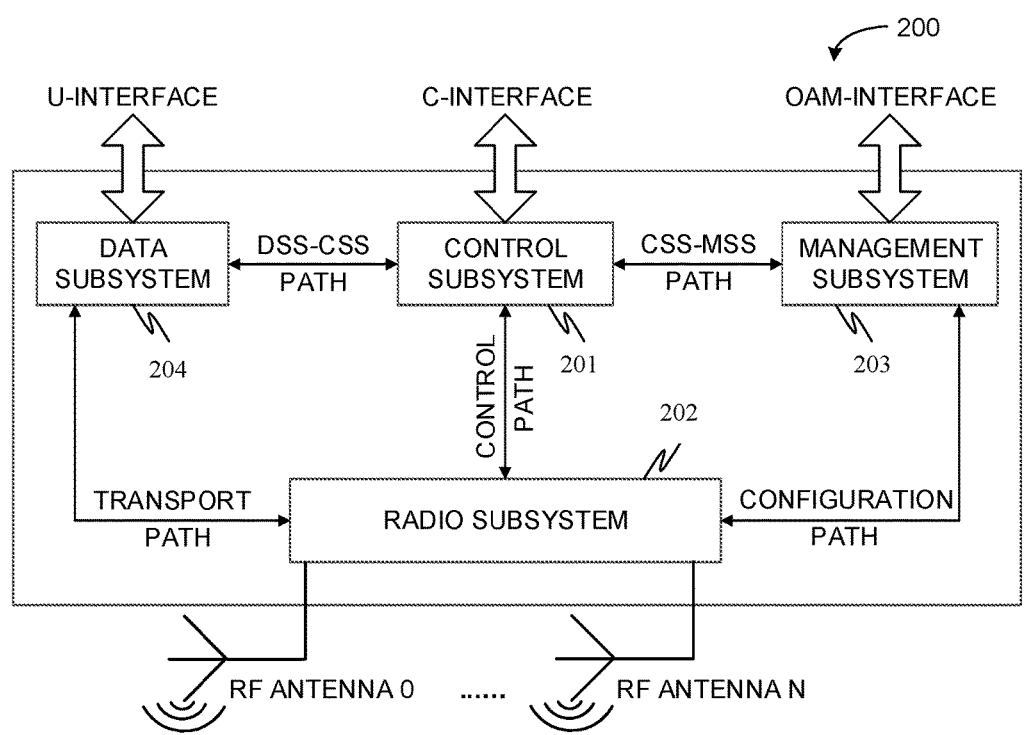
FIG. 2 is a functional block diagram of an exemplary evolved Node B (eNB) that may be employed as the base station (BS) in the communication network for processing data packets for transmission in accordance with some embodiments of the present disclosure.

Referring now to FIG. 2, a functional block diagram of an exemplary evolved Node B (eNB) 200 that may be employed as the BS 102 in the communication network 100 of FIG. 1 for processing data packets for transmission is illustrated, in accordance with some embodiments of the present disclosure. As will be described in greater detail below, the eNB 200 may be responsible for radio resource management, header compression and encryption of user data stream, packet scheduling and transmission, broadcast information transfer, physical layer processing, and so forth. In some embodiments, the eNB 200 includes a control subsystem (CSS) 201, a radio subsystem (RSS) 202, a management subsystem (MSS) 203, and a data subsystem (DSS) 204.

The CSS 201 is responsible for carrying control messages for UE's and core network, and will be described in greater detail in FIG. 3 below. The RSS 202 is responsible for radio communication with the UE's through various radio specific elements. As will be appreciated, the RSS 202 communicates with the UE's through a number of RF Antennas (RF Antenna 0 . . . RF Antenna N). The RSS 202 will be described in greater detail in FIG. 4 below. The MSS 203 is responsible for system level management of co-channel interference, radio resources, and other radio transmission characteristics in eNB, and will be described in greater detail in FIG. 5 below. The DSS 204 is responsible for carrying user traffic as well as control messages for UEs in conjunction with CSS 201, and will be described in greater detail in FIG. 6 below. The CSS 201 configures DSS 204 using configuration messages.

Each of these subsystems 201-204 interacts with each other and with external components through a number of interfaces and data paths. For example, a bidirectional link, U-Interface, connecting the DSS 204 to the serving gateway (SGW) may carry the user plane data over the socket interface. A gateway tunneling protocol (GTP-U) may be employed for communication to exchange user data. It should be noted that the user space data may be data packets between multimedia servers or other users and user multimedia applications such as video, VoIP, gaming, etc. Similarly, a bidirectional link, C-interface, connecting the CSS 201 to MME may carry the control plane information over the socket interface. A S1 application protocol (S1-AP) may be employed for communication to exchange control data. It should be noted that the control space data may be data packets between packet core/eNB and users and may be responsible for radio connection establishment, mobility management, and session management (session establishment & termination). Additionally, a bidirectional link, OAM-interface, connecting the MSS 203 to operations administration and management (OAM) subsystem may carry the management or configuration information over the socket interface and may be employed to receive management or configuration information from OAM and to provide system level feedback to OAM. A TR-69 protocol may be employed for communication to exchange management or configuration data. It should be noted that the management or configuration data may be management or configuration information from OAM subsystem that may be required for configuration or instantiation of eNB.

Further, in an instance, a bidirectional path, transport path, connecting the DSS 204 with the RSS 202 may carry the user plane data as well as control plane data over the message queues depending on protocols employed (e.g., radio link control (RLC) protocol, packed data convergence protocol (PDCP), and medium access control (MAC) protocol). Similarly, a bidirectional path, control path, connecting the CSS 201 with the RSS 202 may carry control plane information over the message queues using radio resource control (RRC) protocol. It should be noted that, in some embodiments, transport path and control path may be interchangeably used depending on the different protocols employed and messages that they carry. Additionally, a bidirectional path, configuration path, connecting the MSS 203 with the RSS 202 may carry configuration information for the RSS 202 over the message queues. In some embodiments, a Femto API (FAPI) standard may be employed for communication in the above referenced paths. Further, a bidirectional path, DSS-CSS path, connecting the DSS 204 with the CSS 201 may be employed to send and receive control and configuration messages from CSS 201. Similarly, a bidirectional path, CSS-MSS path, connecting the MSS 203 with the CSS 201 may be employed for sending control instruction and configuration parameters to CSS 201 and receiving the system level measurement data from CSS 201.

As will be appreciated, during first-time start-up, the eNB 200 performs startup initialization by taking latest inputs of configuration parameters (e.g. from management application that may be a part of the MSS 203) and storing a copy of the received configuration parameters in a local memory of the CSS 201. During subsequent start-ups, the eNB 200 performs reconfiguration of parameters. The eNB 200 checks if there has been any change in eNB configuration parameters. For example, the eNB 200 checks if there is any new configuration parameter by checking the existing parameters. The eNB 200 also checks if any configuration parameter is modified by checking the parameter value. If there is no change in configuration parameters, the eNB 200 loads configuration parameters from the local memory of CSS 201 for performing configuration. However, if there are changes in the configuration parameters, the CSS 201 receives configuration information of eNB from remote storage of the management application through the MSS-CSS communication path. The CSS 201 then takes modified configuration parameters from the management application and configures modified parameters in the eNB 200 and stores a copy of updated configuration parameters in the aforementioned local memory of the CSS 201.

Figure 3:
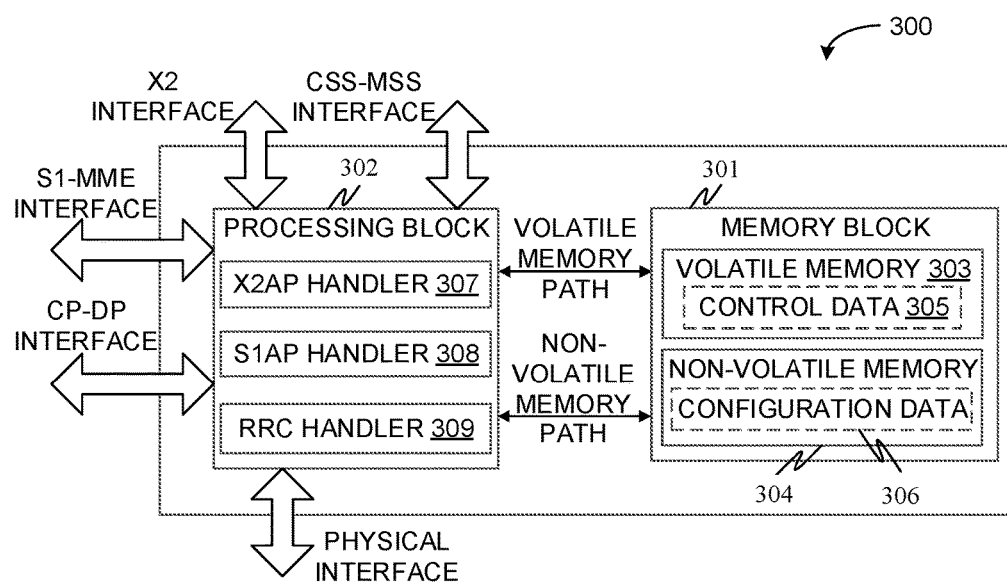
FIG. 3 is a functional block diagram of an exemplary control subsystem that may be employed in the eNB in accordance with some embodiments of the present disclosure.

Referring now to FIG. 3, a functional block diagram of an exemplary control subsystem (CSS) 300 is illustrated, in accordance with some embodiments of the present disclosure. The CSS 300 is analogous to the CSS 201 implemented by the eNB 200 of FIG. 2. The CSS 300 includes a memory block 301 and a processing block 302. The memory block 301 includes a volatile memory 303 and a non-volatile memory 304. The volatile memory 303 in the CSS 300 stores the control data 305 (i.e., data for controlling the radio access and connection between network and UE). The processing block 302 uses volatile memory path to store and retrieve the control data 305 from the volatile memory 303. The non-volatile memory 304 in CSS 300 stores the configuration data 306 received from MSS 203 which in turn stores the configuration data received from OAM. As will be appreciated, the configuration data 306 from the MSS 203 may be employed to configure CSS 201 to make it operational. The processing block 302 uses non-volatile memory path to store and retrieve configuration data 306 from the non-volatile memory 304.

The processing block 302 may include a single processor with the multiple partitions or independent processors working in a group and configured to perform various functions. For example, the processing block 302 may include an X2 application protocol (X2AP) handler 307, a S1 application protocol (S1AP) handler 308, and a radio resource controller (RRC) handler 309. The S1AP handler 308 receives configuration data from MSS 203 through CSS-MSS interface. The S1AP handler 308 then processes the configured data and stores it in the non-volatile memory 304. The S1AP handler 308 further receives control data from packet core (MME) through S1-MME interface in downlink (DL) and from the RRC handler 309 in uplink (UL). On receiving the data, the S1AP handler 308 processes the data (as per 3GPP TS 36.413 specification) and performs services and functions that include, but are not limited to, E-RAB configuration, allocation to/release from user-service-context, initial context set-up transfer function, determination of UE capability information, mobility functions, S1 interface establishment and release, NAS signaling transport function, S1 UE context management, and so forth. After processing the received control data packets and performing the desired execution, the S1AP handler 308 encodes the control data packets and sends the same to the RRC handler 309 in DL and to the packet core (MME) through S1-MME interface in UL. A CP-DP interface may be employed to send and receive control and configuration messages to and from the DSS 204 via the CSS-DSS path.

The X2AP handler 307 receives configuration data from MSS 203 through CSS-MSS interface. The X2AP handler 307 then processes the configured data and stores it in the non-volatile memory 304. The X2AP handler 307 further receives control data packets from RRC handler 309 in the UL and the DL. The X2AP handler 307 also receives control data packets through X2 interface from neighboring eNB's. On receiving the control data packets, the X2AP handler 307 processes the data (as per 3GPP TS 36.423 specification) and performs the services and functions that include, but are not limited to, handover processing, BS load processing, X2 interface establishment, eNB Configuration, and so forth. After processing the received control data packets and performing the desired execution, the X2AP handler 307 encodes the control data packets and sends the same to RRC handler 309 and to neighboring eNB through X2 interface.

The RRC handler 309 receives configuration data from MSS 203 via the CSS-MSS interface, configures itself based on the configuration data, and sends different configuration parameters to the UE's through PHY interface in DL and to the core network in UL. It should be noted that the PHY interface consists of transport channels in eNB and performs exchange of messages between the RSS and the CSS. The RRC handler 309 receives UL control data packets from RLC handler (not shown) and PDCP handler (not shown) and DL control data packets from S1AP handler 308. On receiving the control data packets, the RRC handler 309 processes the data (as per 3GPP TS 36.331 specification) and performs services and functions that include, but are not limited to, system information broadcast for NAS and AS, paging notification, establishment, maintenance and release of an RRC connection between the UE and E-UTRAN, security handling, establishment, configuration, maintenance and release of point to point radio bearers, mobility decision processing, QoS management functions, UE measurement configuration and report handling, NAS message transfer between UE and core network, outer loop power control, and so forth. After processing the received control data packets and performing the desired execution, the RRC handler 309 encodes the data packets and sends the same to UE handler in DL, to S1AP/X2AP handler through S1-MME interface in UL, and to neighboring eNB through X2 interface.

Figure 4:
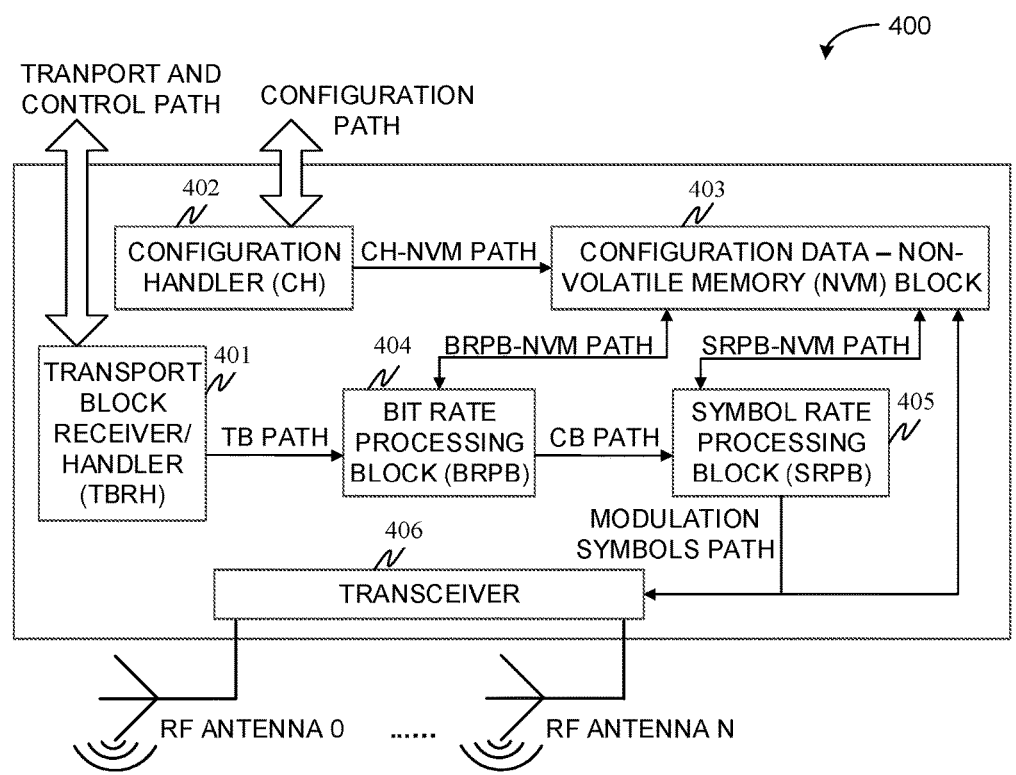
FIG. 4 is a functional block diagram of an exemplary radio subsystem that may be employed in the eNB in accordance with some embodiments of the present disclosure.

Referring now to FIG. 4, a functional block diagram of an exemplary radio subsystem (RSS) 400 is illustrated, in accordance with some embodiments of the present disclosure. The RSS 400 is analogous to the RSS 202 implemented by the eNB 200 of FIG. 2. The RSS 400 includes a PHY handler (not shown), a transport block receiver or handler (TBRH) 401, a configuration handler (CH) 402, a configuration data non-volatile memory block 403, a bit rate processing block (BRPB) 404, a symbol rate processing block (SRPB) 405, and a transceiver 406.

The PHY handler enables exchange of air interface messages between UE's and eNB using PHY protocol. Additionally, the PHY handler interfaces with DSS 204 and CSS 201 and offers data transport services to higher layers. The PHY handler may be responsible for channel coding, PHY hybrid automatic repeat request (HARD) processing, modulation, multi-antenna processing, mapping of the signal to the appropriate physical time-frequency resources, and so forth.

The TBRH 401 receives user data and control streams from the DSS in the form of transport blocks in a communication message over a transport/control path. The TBRH 401 then classifies the data as critical and non-critical data and forwards it to BRPB 404 over the TB path. The TB path is a uni-directional link connecting the TBRH 401 to the BRPB 404 and carries the transport block over the message queue interface.

The CH 402 receives configuration messages from the MSS in a communication message over a configuration path. The CH 402 then classifies and stores the configuration information in the configuration data non-volatile memory block 403. The CH 402 uses a unidirectional CH-Non-Volatile memory path to write the configuration parameters to the configuration data non-volatile memory block 403. The configuration data is stored in the non-volatile memory in the form of structures which is accessible to rest of the RSS 400 modules.

The BRPB 404 receives the transport blocks from the TBRH 401 in a communication message. The BRPB 404 then processes the received transport blocks as per the 3GPP TS 36.212 standard. For example, the BRBP 404 calculates the cyclic redundancy check (CRC) and attaches the same to the transport block. If the transport block size is larger than the maximum allowable code block size, such as a block size of 6,144 bits, a code block segmentation may be performed. Consequently, a new CRC may be calculated and attached to each code block before channel encoding (turbo encoding) provides a high-performance forward-error-correction scheme for reliable transmission. The BRBP 404 further performs rate matching (i.e., puncturing or repetition to match the rate of the available physical channel resource), and HARQ so as to provide a robust retransmission scheme when the user fails to receive the correct data. Additionally, bit scrambling may be performed after code-block concatenation to reduce the length of strings of 0's or 1's in a transmitted signal to avoid synchronization issues at the receiver before modulation. The code blocks may be forwarded to symbol rate processor over the CB path. The CB path corresponds to a uni-directional link connecting the BRPB 404 to the SRPB 405 and carries the code words over the message queue interface. A BRPB-Non-Volatile memory path may be employed to connect the BRPB 404 with the non-volatile memory where the configuration data may be stored.

The SRPB 405 receives code blocks in a communication message from BRPB 404 over the CB path. The SRPB 405 then processes the received code blocks as per the 3GPP TS 36.212 standard. The SRPB 405 processes the code blocks by converting them to modulation symbols. It should be noted that various modulation schemes (quadrature phase shift keying (QPSK), 16-quadrature amplitude modulation (16-QAM), or 64-QAM) may be employed. The modulation symbols may then be mapped to layers and precoding supports for multi-antenna transmission. The modulation symbols may be forwarded over a uni-directional high speed modulation symbols path to the transceiver 406 for transmission. A SRPB-Non-Volatile memory path may be employed to connect the SRPB 405 with the non-volatile memory where the configuration data may be stored.

The transceiver 406 receives modulation symbols over the modulation symbols path. The transceiver 406 then processes the received code blocks as per the 3GPP TS 36.212 standard. For example, the transceiver maps the modulation symbols to resource elements for providing orthogonal multiple access (OMA) or non-orthogonal multiple access (NOMA). The resource elements may then be mapped to each antenna port and sent for air transmission through a number of RF Antennas (RF Antenna 0 . . . RF Antenna N).

Figure 5:
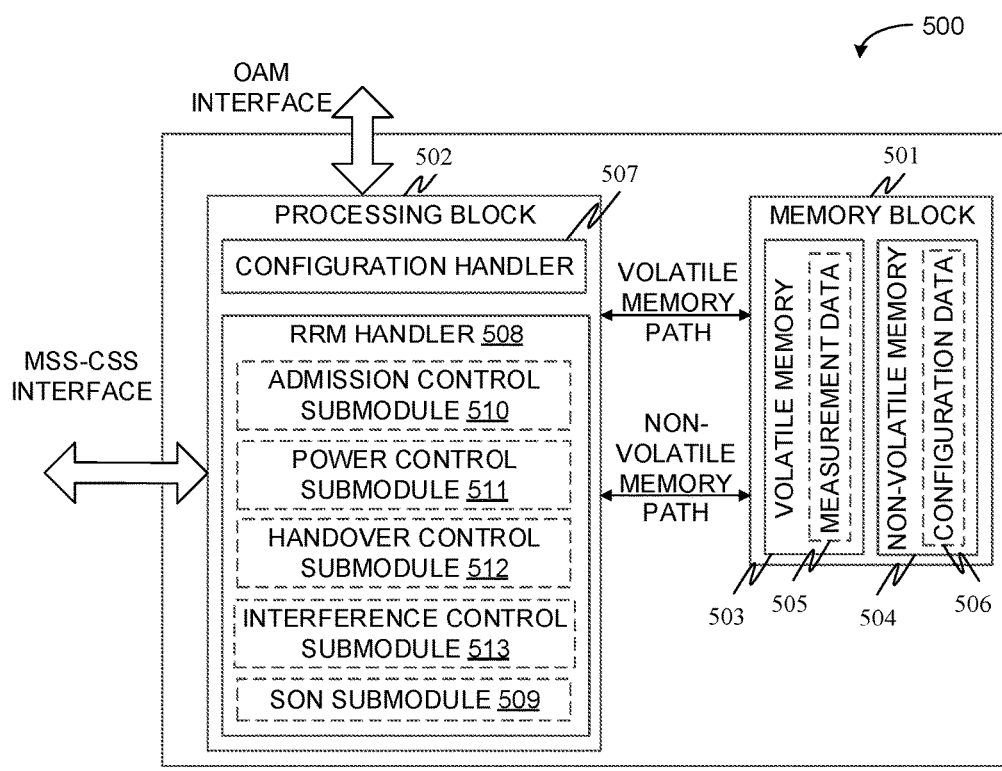
FIG. 5 is a functional block diagram of an exemplary management subsystem that may be employed in the eNB in accordance with some embodiments of the present disclosure.

Referring now to FIG. 5, a functional block diagram of an exemplary management subsystem (MSS) 500 is illustrated, in accordance with some embodiments of the present disclosure. The MSS 500 is analogous to the MSS 203 implemented by the eNB 200 of FIG. 2. The MSS 500 includes a memory block 501 and a processing block 502. The memory block 501 includes a volatile memory 503 and a non-volatile memory 504. The volatile memory 503 in the MSS 500 stores the system level measurement data 505 provided by the CSS. The measurement data 505 represents the different measurement metrics collected from UE and calculated by CSS, DSS and RSS. The measurement data 505 may be used to monitor the prevalent radio network condition so as to take appropriate radio network management decisions. Further, the measurement data 505 may be used to take decision by a radio resource management (RRM) handler as discussed below. The processing block 502 uses volatile memory path to store and retrieve the measurement data 505 from the volatile memory 503. The non-volatile memory 504 in MSS 500 stores the configuration data 506 received from OAM. The configuration data 506 represents the configuration information from OAM subsystem towards eNB required for configuration, updating existing configuration, instantiation of eNBs, and so forth. The processing block 502 accesses the configuration data 506 and configures the CSS, the DSS, and the RSS through MSS-CSS Interface. It should be noted that a portion of the non-volatile memory can persist across system-start-up cycles. The processing block 502 uses non-volatile memory path to store and retrieve configuration data 506 from the non-volatile memory 504.

The processing block 502 may include a single processor with the multiple partitions or independent processors working in a group and configured to perform various functions. For example, the processing block 502 may include a configuration handler 507 and a RRM handler 508. The configuration handler 507 handles the overall configuration of the whole eNB. The configuration handler 507 performs the services and functions, that include, but are not limited to, reception of configuration parameters from OAM and storage of configuration parameters at non-volatile memory during start up, interfacing with the CSS, the DSS, and the RSS, configuration of the CSS, the DSS, and the RSS with the configuration parameters stored at non-volatile memory, reception of reconfiguration parameters from OAM, reconfiguration of the CSS, the DSS and the RSS, providing feedback to OAM to help OAM change in any configuration parameter, and so forth.

The RRM handler 508 takes management decision to efficiently run the eNB and includes a self-organizing network (SON) submodule 509, an admission control submodule 510, a power control submodule 511, a handover control submodule 512, and an interference control submodule 513. The SON submodule 509 performs various functions to (re)organize the eNB in a dynamically changing network topology. These functions include, but are not limited to, physical cell identity (PCI) self-configuration and self-optimization, automatic neighbor relation (ANR) management and X2 link auto creation, cell outage detection, cell coverage optimization, collecting live measurement metrics to provide feedback to the OAM subsystem about current condition of the network, and so forth. It should be noted that any decision is taken based on configuration data and measurement data stored in MSS. The admission control submodule 510 analyzes the current network load and the user capability so as to allow the user connectivity into the network. The power control submodule 511 analyzes different network condition to decide on the transmission power that has to be used by the eNB. The handover control submodule 512 analyzes the measurement data for different neighbor eNB to decide on the target eNB for the handover purpose. The interference control submodule 513 analyzes the measurement data for different neighboring eNB and reconfigures the eNB to reduce interference from other eNB's.

Figure 6:
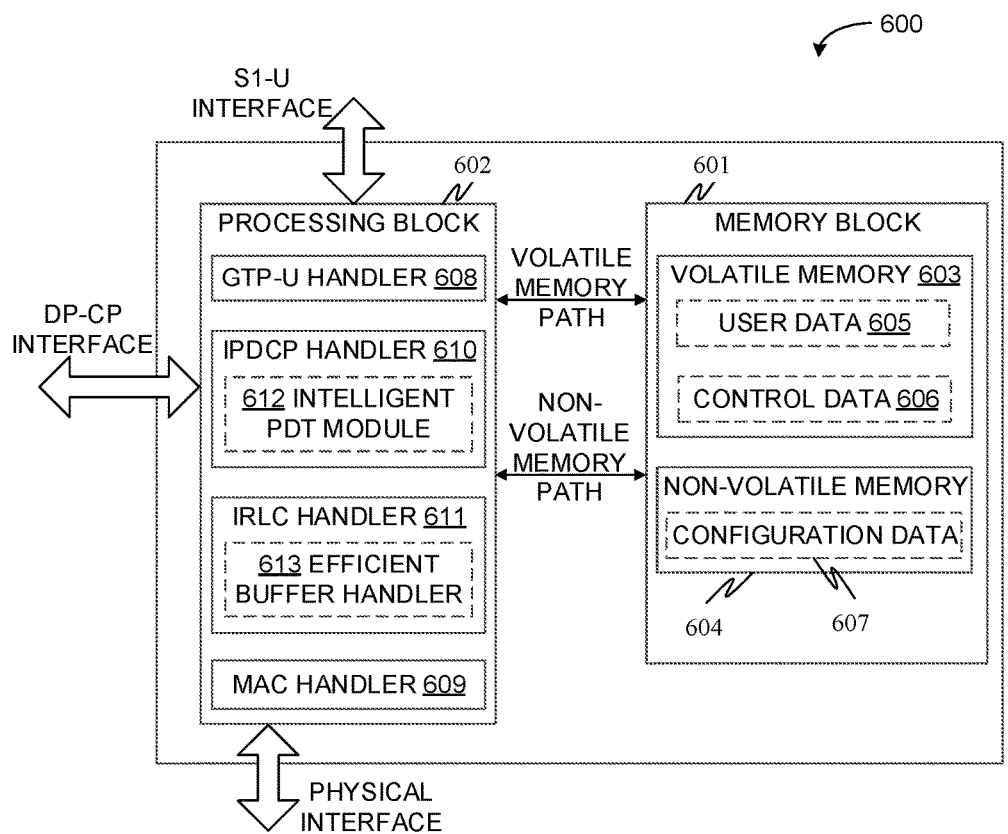
FIG. 6 is a functional block diagram of an exemplary data subsystem that may be employed in the eNB in accordance with some embodiments of the present disclosure.

Referring now to FIG. 6, a functional block diagram of an exemplary data subsystem (DSS) 600 is illustrated, in accordance with some embodiments of the present disclosure. The DSS 600 is analogous to the DSS 204 implemented by the eNB 200 of FIG. 2. The DSS 600 includes a memory block 601 and a processing block 602. The memory block 601 includes a volatile memory 603 and a non-volatile memory 604. The volatile memory 603 in the DSS 600 stores the control data 605 (i.e., data for controlling the radio access and connection between network and UE) and user data 606 (i.e., data specific to user's application data such as voice). The processing block 602 uses volatile memory path to store and retrieve the control data 605 and the user data 606 from the volatile memory 603. The non-volatile memory 604 in DSS 600 stores the configuration data 607 received from CSS 201. As will be appreciated, the configuration data 607 from the CSS 201 may be employed to configure DSS 204 to make it operational, and to perform effective PDCP discard for data packet. In some embodiments, the configuration parameters may include, but are not limited to, a quality class indicator (QCI), a time delay budget (i.e., a running time for delay budget timer (DBT)), a maximum tolerable delay (MTD) for any data packet to remain in transmit buffer of the IPDCP handler and IRLC handler, a minimum number of RLC transmit buffer occupancy (RTBO) categories, a number of radio bearer (RB) index, a RLC buffer size index, a data packet discard group (DPDG) total packet index, a DBT index, a MTD index, and an average RTBO index. It should be noted that a portion of the non-volatile memory can persist across system-start-up cycles. The processing block 602 uses non-volatile memory path to store and retrieve configuration data 607 from the non-volatile memory 604.

The processing block 602 may include a single processor with the multiple partitions or independent processors working in a group and configured to perform various functions. For example, the processing block 602 may include a GTP-U handler 608 and a MAC handler 609. The processing block may further include an improved PDCP (IPDCP) handler 610 and an improved RLC (IRLC) handler 611 in accordance with aspects of the present disclosure. The GTP-U handler 608 receives configuration data from CSS 201 through DP-CP interface, and configures itself based on the configuration data. Additionally, the GTP-U handler 608 receives user data from packet core (e.g., SGW) through S1-U interface in downlink (DL) and from the IPDCP handler 610 in uplink (UL). On receiving the data, the GTP-U handler 608 processes the data as per 3GPP TS 29.281 specification. For example, the GTP-U handler 608 provides tunnel of user traffic between the eNB and the SGW. After processing the received data packets, the GTP-U handler 608 sends the data packets to SGW through S1-U interface in UL and to IPDCP handler 610 in DL. A DP-CP interface may be employed to send and receive control and configuration messages to and from the CSS 201 via the CSS-DSS path.

The MAC handler 609 receives configuration data from CSS 201 through DP-CP interface, and configures itself based on the configuration data. Additionally, the MAC handler 609 receives data from IRLC handler 611 in downlink (DL) and from the RSS 202 in uplink (UL) through PHY interface. The PHY interface comprises transport channels and is responsible for exchange of data between RSS 202 and DSS 204. On receiving the data, the MAC handler 609 processes the data (as per 3GPP TS 36.321 specification) and performs services and functions that include, but are not limited to, error correction through HARQ, priority handling between UEs by means of dynamic scheduling, priority handling between logical channels of one UE (i.e., logical channel prioritization), and so forth. The MAC handler 609 is also responsible for multiplexing of data packets received from the IRLC handler 611 onto transport blocks (TB) to be delivered to the RSS 202 on transport channels, and for de multiplexing of received transport blocks (TB) delivered from the RSS 202 on transport channels. After processing the received data packets, the MAC handler 609 passes the data packets to RSS 202 in DL and to IRLC handler 611 in UL.

The IPDCP handler 610 receives configuration data from CSS 201 through DP-CP interface, and configures itself based on the configuration data. The IPDCP handler 610 further receives control data from CSS 201 in downlink (DL) and from the IRLC handler 611 in uplink (UL). Additionally, the IPDCP handler 610 receives user data from GTP-U handler 608 in DL and from the IRLC handler 611 in UL. On receiving the data, the IPDCP handler 610 processes the data as per 3GPP TS 36.323 specification. The IPDCP handler 610 is responsible for header compression of user data in DL, and for header decompression in UL. The IPDCP handler 610 is also responsible for ciphering and deciphering of user data and control data as well as for integrity protection of control data in DL, and for integrity verification of control data in UL. The IPDCP handler 610 is further responsible for timer based discard of data packets so as to maintain delay sensitivity of data packet. After processing the received data packets, the IPDCP handler 610 sends the control data to CSS 201, and user data to GTP-U handler 608 in UL, and both control as well as user data to IRLC handler 611 in DL.

The IPDCP handler 610 further includes an intelligent PCDP discard timer (PDT) module 612 for effective control and orchestration of PDCP timer, and for effective PDCP discard of data packet. The intelligent PDT module 612 receives configuration data, through the DP-CP interface, from CSS 201, which in turn receives from MSS 203, which in turn stores the configuration data received from OAM. The intelligent PDT module 612 then loads the configuration data into its own persistent-memory (IPDCPH-PM) for local configuration (LC). Thus, the IPDCP handler 610 keeps radio bearer configuration related parameters (e.g. time delay budget) as LC in IPDCPH-PM. The IPDCP handler 610 may extract the necessary configuration parameters like total QCI's to be supported, initial values for PDT's and DBT's etc. by accessing LC from IPDCPH-PM. In an embodiment, the configuration data may have the parameters that include, but are not limited to, a quality class indicator ($QCI_{(i)}$), a time delay budget (DelayBudgetTime$_{(i)}$), a maximum tolerable delay (MaxTolerableDelayTime$_{(i)}$), a number of RB index (NumRb$_{Index}$) a RLC buffer size index (RlcBuf$_{Index}$), DPDG total packet index (TotalPktInDpdg$_{Index}$) a delay budget time index (DelayBudget$_{Index}$), a maximum tolerable delay index (MaxTolerableDelay$_{Index}$), an average RTBO index (ARtbo$_{Index}$), and a minimum number of RTBO categories (MinRtboBin$_{Num}$). Each of the above mentioned configuration parameters is described below.

Typically, a radio bearer which is carrying user payload has a QCI. The eNB schedules the user packets based on the QCI value. The IPDCP handler 610 receives $QCI_{(i)}$ from the OAM at time of configuration and re-configuration of a radio bearer in the IPDCP handler 610. Further, the duration of standard holding time of a data packet in PDCP transmit buffer (PTB) is denoted by DelayBudgetTime$_{(i)}$. Again, the IPDCP handler 610 receives this parameter from OAM during a radio bearer configuration and re-configuration. Additionally, the duration of maximum holding time of a data packet in PDCP transmit buffer (PTB) is denoted by MaxTolerableDelayTime$_{(i)}$. Again, the IPDCP handler 610 receives this parameter from OAM during a radio bearer configuration and re-configuration. The NumRb$_{Index}$ represents an index to be applied to NumRb while creating data packet discard groups (DPDG's). Similarly, the RlcBuf$_{Index}$ represents an index to be applied to RLC buffer size to determine maximum number of packets in each of the DPDG's. Further, the TotalPktInUpdg$_{Index}$ represents an index to be applied to total packet in each of DPDG's to determine running time (RT) of a corresponding PDT. Further, the DelayBudget$_{Index}$ represents an index to be applied to time delay budget to determine running time (RT) of a PDT. Further, the MaxTolerableDelay$_{Index}$ represents an index to be applied to maximum tolerable delay to determine running time (RT) of a PDT. Further, the ARtbo$_{Index}$ represents an index to be applied to the average RTBO to determine running time (RT) of a PDT. Additionally, the MinRtboBin$_{Num}$ represents a minimum number of RTBO bins to be created with respect to the RTBO.

The IRLC handler 611 receives configuration data from CSS 201 through DP-CP interface, and configures itself based on the configuration data. The IRLC handler 611 further receives control data and user data from the MAC handler 609 in uplink (UL) and from the IPDCP handler 610 in downlink (DL). On receiving the data, the IRLC handler 611 processes the data as per 3GPP TS 36.322 specification. The IRLC handler 611 is responsible for segmentation and concatenation of received data packets in DL, and re-assembly of received data packets in UL. Additionally, the IRLC handler 611 detects and discards duplicate data packets received in UL. After processing the received data packets, the IRLC handler 611 sends the data packets to the IPDCP handler 610 in UL, and to the MAC handler 609 in DL.

The IRLC handler 611 further includes an efficient buffer handler (EBH) 613 for group based discarding of service data unit (SDU), and for computing the RTBO and the average RTBO. The EBH 613 receives configuration data from OAM (via MSS 203, CSS 201, and DP-CP interface), and loads the same into its own persistent-memory (IRLCH-PM) for local configuration (LC). Thus, the IRLC handler 611 keeps radio bearer configuration related parameters (e.g. QCI) as LC in IRLCH-PM. The IRLC handler 611 may extract the necessary configuration parameters like total QCI's to be supported by accessing LC from IRLCH-PM. In an embodiment, the configuration data may have the parameters that include, but are not limited to, a quality class indicator (QCI$_{(i)}$). As noted above, any radio bearer carrying user payload has a QCI and the eNB schedules the user packets based on the QCI value. The IRLC handler 611 receives QCI$_{(i)}$ from the OAM at time of configuration and re-configuration of a radio bearer in the IRLC handler 611.

It should be noted that, apart from the DSS 600, some of the other modules, subsystems, or network elements may have to be modified for processing data packets so as to implement and/or provide effective PDCP discard for data packets during data packet transmission in the communication network. For example, network elements responsible for providing configuration parameters (e.g., OAM in MME, MSS) or modules responsible for transmission of modulation symbols (e.g., transceiver in RSS) may be accordingly modified within the aspects of the present disclosure.

Further, it should be noted that the above discussed subsystems (CSS300, RSS 400, MSS 500, DSS 600, etc.) and their modules may be implemented in programmable hardware devices such as programmable gate arrays, programmable array logic, programmable logic devices, and so forth. Alternatively, the subsystems and modules may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code may be a single instruction, or many instructions, and may even be distributed over several different code segments, among different applications, and across several memory devices.

As will be appreciated by one skilled in the art, a variety of processes may be employed for processing data packets for transmission in a wireless communication network. For example, the exemplary communication network 100 and the associated base station (such as eNB 200) may facilitate processing of data packets for transmission by the processes discussed herein. In particular, as will be appreciated by those of ordinary skill in the art, control logic and/or automated routines for performing the techniques and steps described herein may be implemented by components of the communication network 100 (e.g., the base station 102), either by hardware, software, or combinations of hardware and software. For example, a suitable code may be accessed and executed by the one or more processors on the BS 102 to perform some or all of the techniques described herein. Similarly, application specific integrated circuits (ASICs) configured to perform some or all of the processes described herein may be included in the one or more processors on the BS 102. Additionally, it should be noted that though the process described below focuses on eNB, the process may also be equally applicable to other base station (e.g., Node B) and will follow substantially similar principles with appropriate modifications in the data subsystem as well as any other associated subsystems.

Figure 7:
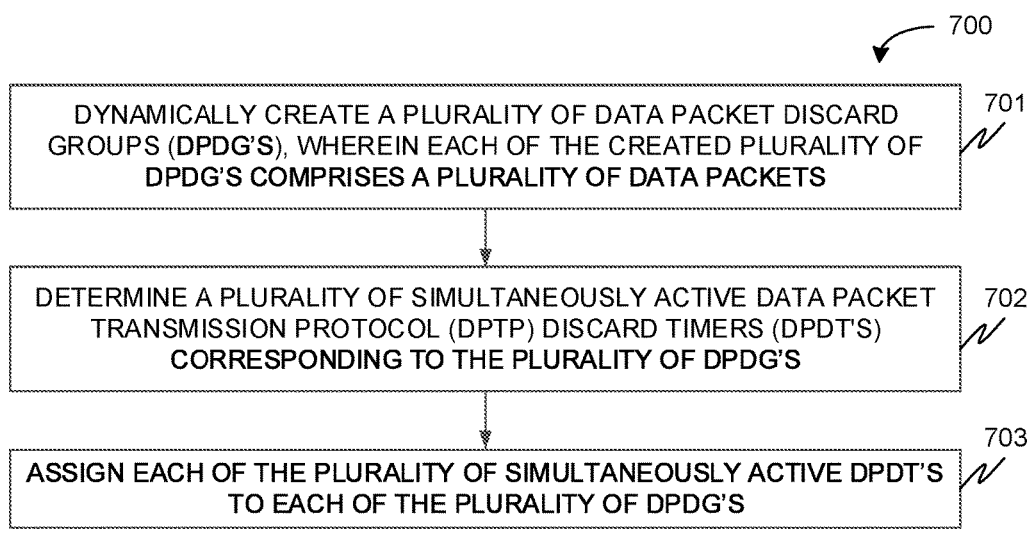
FIG. 7 is a flow diagram of an exemplary process for processing data packets for transmission in a communication network in accordance with some embodiments of the present disclosure.

For example, referring now to FIG. 7, exemplary control logic 700 for processing data packets for transmission in a communication network 100 via a system, such as the BS 102 (e.g., eNB 200), is depicted via a flowchart, in accordance with some embodiments of the present disclosure. As illustrated in the flowchart, the control logic 700 includes the steps of dynamically creating a plurality of data packet discard groups (DPDG's) at step 701, determining a plurality of simultaneously active data packet transmission protocol (DPTP) packet discard timers (DPDT's) corresponding to the plurality of DPDG's at step 702, and assigning each of the plurality of simultaneously active DPDT's to each of the plurality of DPDG's at step 703. It should be noted that each of the created plurality of DPDG's comprises a plurality of data packets.

In some embodiments, the control logic 700 further includes the step of initializing the network device with a plurality of configuration parameters. Further, in some embodiments, the plurality of configuration parameters comprises at least one of a quality class indicator (QCI), a delay budget timer (DBT), a maximum tolerable delay (MTD), a minimum number of RLC transmit buffer occupancy (RTBO) categories, a number of radio bearer (RB) index, a RLC buffer size index, a DPDG total packet index, a DBT index, a MTD index, and an average RTBO index. Additionally, in some embodiments, the control logic 700 further includes the step of allocating a delay budget timer (DBT) to the plurality of data packets, based on a service category.

In some embodiments, the plurality of DPDG's is dynamically created at step 701 based on at least one of a service category, a state of RLC transmit buffer occupancy (RTBO), and a maximum number of data packets in each of the DPDG. Additionally, in some embodiments, the control logic 700 further includes the steps of dynamically determining a plurality of running times (RT's) corresponding to the plurality of DPDT's, and assigning each of the plurality of RT's to each of the plurality of DPDG's. Further, in some embodiments, the plurality of RT's is dynamically determined based on at least one of a number of data packets present in each of the plurality of DPDG's, a time delay budget (TDB) of a service category, and a maximum tolerable delay (MTB) for TDB of a service category.

In some embodiments, the control logic 700 further includes the step of optimizing an internal control message (ICM) for each of the plurality of DPDG's by generating the ICM based on a sequence number of data packets in the corresponding DPDG. Further, in some embodiments, the assignment of each of the plurality of simultaneously active DPDT's at step 703 triggers upon expiry of at least one of: a running delay budget timer (DBT), and an already running PDT. Additionally, in some embodiments, the control logic 700 further includes the step of discarding the plurality of data packet associated with each of the plurality of DPDG's on expiry of the corresponding DPDT.

In some embodiments, the DPTP corresponds to a packet data convergence protocol (PDCP) and the DPDT corresponds to a PDCP discard timer (PDT). Additionally, in some embodiments, the network device corresponds to a base station (e.g., eNB, Node B, etc.) and the data packets are processed for downlink data transmission. Alternatively, in some embodiments, the network device corresponds to a user equipment (UE) and the data packets are processed for uplink data transmission. It should be noted that, in such embodiments, the configuration parameters may be provided by the base station to the user equipment (UE). The IPDCP handler and the IRLC handler in the UE may then process the data packets for uplink data transmission in accordance with embodiments of the present disclosure and similar to the process described for downlink data transmission.

Figure 8:
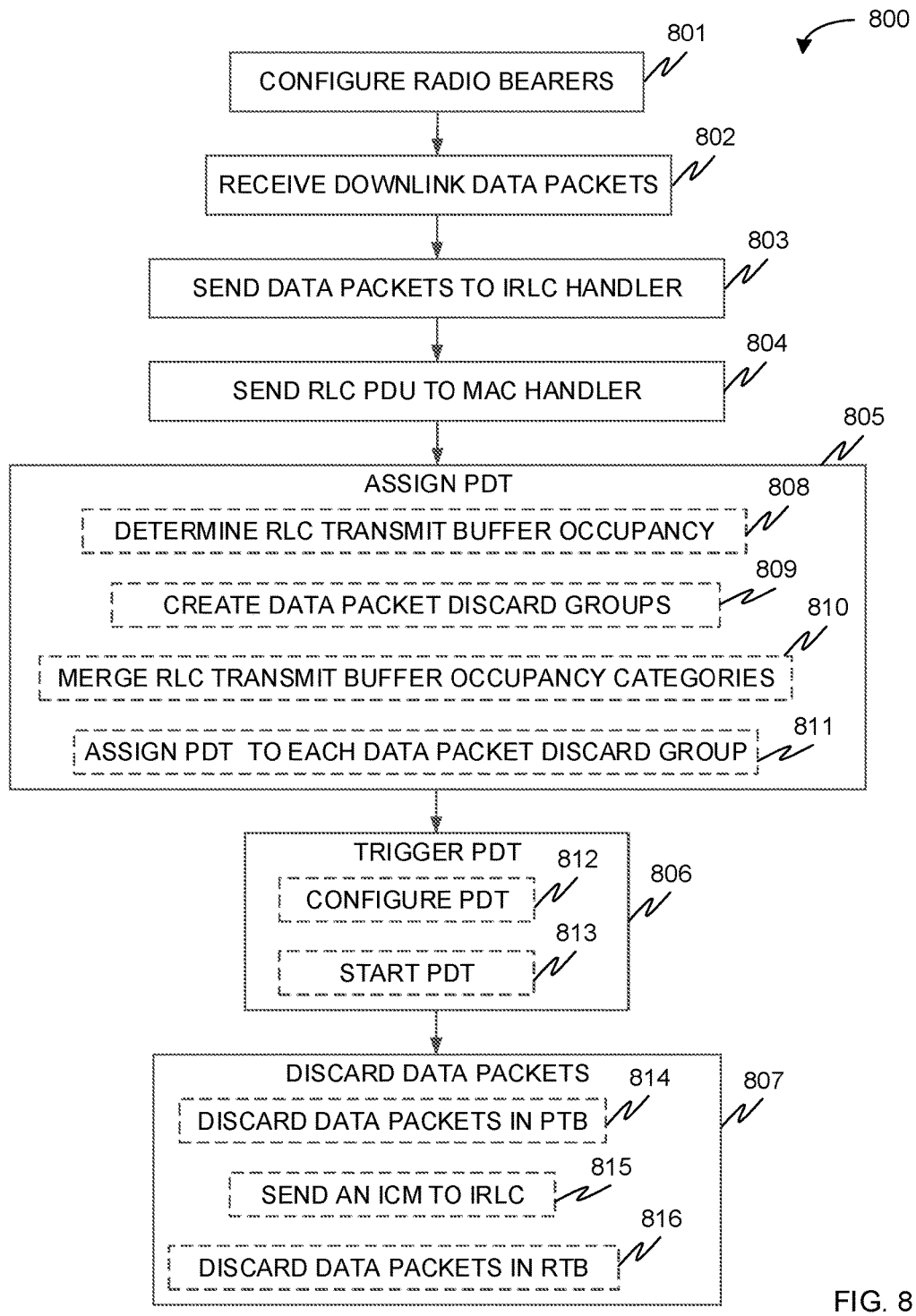
FIG. 8 is a flow diagram of a detailed exemplary process for processing data packets for transmission in a communication network in accordance with some embodiments of the present disclosure.

Referring now to FIG. 8, exemplary control logic 800 for processing data packets for transmission in a communication network 100 is depicted in greater detail via a flowchart in accordance with some embodiments of the present disclosure. As illustrated in the flowchart, the control logic 800 includes the steps of configuring radio bearers at step 801, receiving downlink data packets at step 802, sending data packets to the IRLC handler at step 803, sending RLC protocol data unit (PDU) to the MAC handler at step 804, assigning PDT at step 805, triggering PDT at step 806, and discarding data packets at step 807. Each of these steps will be described in greater detail herein below. It should be noted that the exemplary control logic 800 is described mainly with respect to downlink process, eNB, and PDCP having a PDT discussed above. However, as will be appreciated by those skilled in the art, the exemplary control logic 800 may be equally applicable to uplink process, other BS's (e.g., Node B), and other data packet transmission protocol (DPTP) (e.g., PDP) having a DPTP packet discard timer (DPDT), and will follow substantially similar logic with appropriate modifications and improvements.

At step 801, after receiving the confirmation of user service initiation from the core network, the CSS sends the IPDCP handler added configuration parameters through DP-CP interface so as to configure or re-configure a radio bearer in the IPDCP handler. In some embodiments, the IPDCP handler configures or reconfigures the QCI, the delay budget timer (DBT), the maximum tolerable delay (MTD), a minimum number of RTBO categories, and a number of necessary indices so as to perform effective data packet discard for a radio bearer which carries the data packet.

By way of example, in some embodiments, the IPDCP handler configures the radio bearer as follows:
a) The IPDCP handler first configures the radio bearer with received QCI. The IPDCP handler then configures the QCI of a radio bearer with QCI(i).

b) The IPDCP handler then creates a delay budget timer (DBT).
  If, a DBT is not created within all the radio bearers (RB's) under same QCI(i), then
    the IPDCP handler creates a DBT with received Delay-BudgetTime(i) which is received from OAM.
c) The IPDCP handler then creates appropriate number of RTBO categories.
  If, the minimum number of RTBO categories are not created within all the RB's under same QCI(i), then
    the IPDCP handler creates RTBO categories as per determined number of RTBO categories as follows:
      Create minimum number of RTBO categories ($RtboBin_{(k)}$) based on received $MinRtboBin_{Num}$ from OAM. It should be noted that k is the RtboBin number ranging from 0 to $MinRtboBin_{Num-1}$,
      Set the threshold values ($MinRtboBinTh_{(k)}$ and $MaxRtboBinTh_{(k)}$) of RTBO category ($RtboBin_{(k)}$) with respect to RTBO. It should be noted that a difference between $MaxRtboBinTh_{(k)}$ and $MaxRtboBinTh_{(k)}$ is represented by $ThresholdWidth_{(k)}$. Further, it should be noted that the maximum threshold width possible at any given time for any $RtboBin_{(k)}$ is represented by $ThresholdWidth_{max}$ and depends on $MinRtboBin_{Num}$,
      If total number of RTBO categories at given moment is TotalRtboBin, then the IPDCP handler performs the following steps:
        Compute $ThresholdWidth_{max}=(100/MinRtboBin_{Num})$, Get value of TotalRtboBin as $TotalRtboBin=MinRtboBin_{Num}$,
        $MinRtboBinTh_0=1$,
        $MaxRtboBinTh_0=ThresholdWidth_{max}$,
        In a loop: $k<MinRtboBin_{Num}$ (k=0 to $MinRtboBin_{Num}-1$) $MinRtboBinTh_{(k+1)}=MaxRtboBinTh_{(k)}+1$, and $MaxRtboBinTh_{(k+1)}$ $MinRtboBinTh_{(k+1)}+ThresholdWidth_{max}$.

Additionally, the CSS sends the IRLC handler configuration parameters through DP-CP interface so as to configure or re-configure a radio bearer in the IRLC handler. In some embodiments, the IRLC handler configures or reconfigures the QCI. By way of example, in some embodiments, the IRLC handler configures the radio bearer as follows:
a) The IRLC handler first configures the radio bearer with received QCI. The IRLC handler then configures the QCI of a radio bearer with QCI(i).
b) Create the appreciate RB list as per QCI.
  Add the RB in the QciRbList(i) under same QCI(i) where QciRbList(i) is the list of RB's under same QCI(i).

At step 802, the IPDCP handler awakes up on receipt of data packets arrival intimation or signal from GTP-U. The IPDCP handler then receives downlink (DL) data packets from the SGW through GTP-U. By way of example, in some embodiments, the IPDCP handler handles the received data packets as follows:
a) The IPDCP handler stores the received DL data packets in PDCP transmit buffer (PTB). In some embodiments, the IPDCP handler stores the received DL data packets into RB specific PTB with received time stamp ($RcvdPktTimeStamp_{(s)}$), where 's' represents the $s^{th}$ data packet in sequence of receiving for a RB.
b) The IPDCP handler then starts the delay budget timer (DBT).

If, the received data packet is the first packet in sequence within all the RB's under same $QCI_{(i)}$ or no $PdcpDiscardTimer_{(o)}$ is running for any DataPacketDiscardGroup$_{(o)}$ under the same $QCI_{(i)}$, where the DataPacketDiscardGroup$_{(o)}$ represents data packet discard group (DPDG), where the PdcpDiscardTimer$_{(o)}$ is the PDT allocated to DataPacketDiscardGroup$_{(o)}$, and where 'o' stands for $o^{th}$ DPDG under same $QCI_{(i)}$, then
    the IPDCP handler starts DBT with DelayBudgetTime$_{(i)}$ as running time,
Else
    If, DPDG is not determined for the RB of the received user packet, then
        the IPDCP handler associates received data packet with a DataPacketDiscardGroup(o) which is having PDT with highest running time,
    Else
        the IPDCP handler associates received user packet with determined DataPacketDiscardGroup$_{(o)}$.

At step 803, the IPDCP handler sends received data packets to the IRLC handler. In some embodiments, the IPDCP handler sends received data packets to the IRLC handler after making the data packets, if so configured, integrity protected and ciphered. The IRLC handler stores the data packets in the RLC transmit buffer (RTB). In some embodiments, the IRLC handler maintains the received data packets in radio bearer (RB) specific RLC Transmit Buffers (RTB's) by the IRLC handler. The IRLC handler then increments an RLC service data unit (SDU) count in the RTB. By way of example, in some embodiments, the IRLC handler increments the RLC SDU count as follows:
    RlcDlPktCount$_{(l)}$=RlcDlPktCount$_{(l)}$+1, where RlcDlPktCount$_{(l)}$ is a number of RLC SDU present in RTB where 'l' is the $l^{th}$ RB (the RB in that data packet received) in QciRbList(i) (when a DBT is running for $QCI_{(i)}$) OR list of RB's of DataPacketDiscardGroup$_{(o)}$ (DPDG of data packet).

At step 804, the IRLC handler sends the RLC protocol data unit (PDU) to the MAC handler. The IRLC handler request the MAC handler for transmit opportunity to be granted. In some embodiments, the IRLC handler informs MAC handler regarding its transmission buffer size by sending an internal control message (ICM) such as a MAC status request. The MAC handler then provides the transmit opportunity to the IRLC handler. In some embodiments, the MAC handler provides the IRLC handler with its current available capacity information by sending transmission-opportunity message such as a MAC status indication. The IRLC handler then sends RLC PDU to the MAC handler. In some embodiments, the IRLC handler compiles (concatenation and/or segmentation along with header addition) data packets from one or more RTB's (queues) based on the transmission opportunity information. The IRLC handler then sends the compiled message as a MAC data request to the MAC handler by putting the same into the MAC queue. The IRLC handler then decrements RLC SDU count in the RTB. The MAC handler further processes the data packets, and sends the same to RSS for air transmission. By way of example, in some embodiments, the IRLC handler decrements the RLC SDU count as follows:
    If, IRLC handler sends complete RLC SDU to the MAC handler, then RlcDlPktCount$_{(l)}$=RlcDlPktCount$_{(l)}$−1.

At step 805, the IPDCP handler assigns PDT for data packets. The assignment or allocation of PDT triggers upon expiry of a running DBT or upon expiry of a running PDT. In some embodiments, the assignment of PDT includes the steps of determining RLC transmit buffer occupancy (RTBO) at step 808, creating data packet discard groups (DPDG's) at step 809, merging RTBO categories at step 810, and assigning a simultaneously active PDT to each of the DPDG's at step 811. Each of these steps will be described in greater detail herein below.

At step 808, the IRLC handler determines the RTBO of RB's belonging to same QCI OR DPDG. By way of example, in some embodiments, the IRLC handler determines the RTBO as follows:
a) Find the appropriate RB list based on type of the timer.
    If, the assignment triggered by expiry a DBT, then
        RbList=QciRbList$_{(i)}$ (RB list under $QCI_{(i)}$,
    If, the assignment triggered by expiry a PDT, then
        RbList=List of RB under DPDG for which PDT expired.
b) Determine RTBO for RB's
    In a loop: 1<RbListSize where l=0 to RbListSize
        compute RTBO$_{(l)}$ (RlcDlPktCount$_{(l)}$/RlcTransmitBufferSize$_{(l)}$)*100, where RlcTransmitBufferSize$_{(l)}$ is RLC transmit buffer Size of the RB, where l is the $l^{th}$ RB in RbList, where RTBO$_{(l)}$ is RTBO of lth RB, and where RbListSize is a size of RbList.

At step 809, the IPDCP handler starts creating the DPDG's after the determination of RTBO in step 808. By way of example, in some embodiments, the IRLC handler determines the RTBO as follows:
a) Group the RB's under same $QCI_{(i)}$ based on RTBO.
    In a loop: 1<RbListSize where l=0 to RbListSize
        Create DpdgRBList$_{(k)}$ by adding the RB$_{(l)}$ to DpdgRBList$_{(k)}$ by comparing RTBO$_{(l)}$ if it falling in the range of RTBO thresholds MinRtboBinTh$_{(k)}$ and MaxRtboBinTh$_{(k)}$ of RTBO Bins,
        Increment DpdgRBListSize$_{(k)}$ as DpdgRBListSize$_{(k)}$=DpdgRBListSize$_{(k)}$+1, where DpdgRBList$_{(k)}$ is a list of RB(s) in a DataPacketDiscardGroup$_{(k)}$, where DpdgRBListSize$_{(k)}$ is size of list of RB(s) in a DataPacketDiscardGroup$_{(k)}$, where DataPacketDiscardGroup$_{(k)}$ is a data packet discard group formed by IPDCPH to allocate a PDT to a group of data packets, where 'k' represents $k^{th}$ group of data packet discard groups, and where RB$_{(l)}$ is lth RB in RbList.
b) In a Loop for all formed list in step (a) above, determine average RTBO (CRtbo$_{Avg\ (k)}$) of formed RB List DpdgRBList$_{(k)}$. Crtbo$_{Avg(k)}$=(ΣRTBO$_{(m)}$/DpdgRBListSize$_{(k)}$), where m=0 to DpdgRBListSize$_{(k)}$−1.
c) Determine maximum allowable number of data packets in a DPDG (MaxPktInUpdg$_{(k)}$). MaxPktInDpdg$_{(k)}$=(RlcTransmitBufferSize$_{(n)}$*RlcBuf$_{Index}$)+((1−CRtbo$_{Avg(k)}$)*ARtbo$_{Index}$))+(DpdgRBListSize$_{(k)}$*NumRb$_{Index}$), where n=0 to DpdgRBListSize$_{(k)}$−1.
d) Check and divide DpdgRBList(k) based on maximum allowable number of packets in a DPDG
    If, total number of data packets in DpdgRBList$_{(k)}$ (TotalPktInDpdg$_{(k)}$)>MaxPktInDpdg$_{(k)}$, then
    divide the RtboBin$_{(k)}$ into two RTBO bins by diving ThresholdWidth of RtboBin$_{(k)}$ by 2,
    compute the RTBO thresholds of new RTBO bins:
        $1^{st}$ RtboBin$_{(k)\ (new)}$:
            MinRtboBinTh$_{(k)(new)}$=MinRtboBinTh$_{(k)(old)}$,
            MaxRtboBinTh$_{(k)(new)}$=MaxRtboBinTh$_{(k)(old)}$/2),
        $2^{nd}$ RtboBin$_{(k+1)\ (new)}$:
            MinRtboBinTh$_{(k+1)(new)}$=(MaxRtboBinTh$_{(k)(old)}$/2)+1
            MaxRtboBinTh$_{(k+1)(new)}$=MaxRtboBinTh$_{(k)(old)}$ Increment TotalRtboBin as TotalRtboBin= TotalRtboBin+1, Recursive call of steps (a)-(d) for DpdgRBList$_{(k)(old)}$ as RbList and size of DpdgRB-List$_{(k)(old)}$ as RbListSize on two newly formed RTBO Bins with its computed RTBO thresholds.

e) Finally, all DPDG(s) created are based on total number of computed DpdgRBList.

DpdgRBList$_{(o)}$ is mapped to DataPacketDiscard-Group$_{(o)}$, where o=0 to (size of total number of DpdgRBList-1).

At step 810, the IRLC handler merges the RTBO categories till no more merge is possible. By way of example, in some embodiments, the IRLC handler merges the RTBO categories as follows:

In a recursive loop till no merge possible based on below condition:

Determine RTBO thresholds for the merged RTBO categories,

If, no RB$_{(l)}$ falls within the range of MinRtboBinTh$_{(k)}$ and MaxRtboBinTh$_{(k)}$ of RtboBin$_{(k)}$ AND Threshold-Width$_{(k)}$ ThresholdWidth$_{max}$, where Threshold-Width$_{(k)}$: represents the threshold width of RtboBin$_{(k)}$ that is computes as ThresholdWidth$_{(k)}$=MaxRtboBin-Th$_{(k)}$−MinRtboBinTh$_{(k)}$, If, ThresholdWidth$_{(k)}$ and ThresholdWidth$_{(k+1)}$ are same, merge RtboBin$_{(k)}$ and RtboBin$_{(k+1)}$ as single Rtbo-Bin$_{(k)(new)}$, where RtboBin$_{(k)}$ and RtboBin$_{(k+1)}$ represents adjacent RTBO categories with respect to continuous value of RTBO thresholds, For RtboBin$_{(k)\ (new)}$, RTBO bin's thresholds are computed as below:

MinRtboBinTh$_{(k)(new)}$=MinRtboBinTh$_{(k)(old)}$, and MaxRtboBinTh$_{(k)(new)}$=MaxRtboBinTh$_{(k+1)(old)}$.

At step 811, the IPDCP handler assigns or allocates a PDT to each data packet discard group (DPDG). By way of example, in some embodiments, the IPDCP handler allocates PDT to DPDG as follows:

In a loop o<(size of total number of created DPDG in step 809 (where o=0 to size of total number of DPDG)

Allocate PdcpDiscardTimer$_{(o)}$ to DataPacketDiscard-Group$_{(o)}$, where PdcpDiscardTimer$_{(o)}$ represents the PDCP discard timer which is allocated to DataPack-etDiscardGroup$_{(o)}$ At step 806, the IPDCP handler triggers PDCP discard timers (PDT's) for the DPDG's. In some embodiments, the triggering of PDT includes the steps of configuring a PDT for each DPDG at step 812, and starting the PDT for each DPDG at step 813. At step 812, the IPDCP handler configures the PDT by determining a running time (RT) of the PDT. By way of example, in some embodiments, the IPDCP handler determines the RT of the PDT as follows:

In a loop: o<(size of total number of created DPDG in step 805), where 'o'=0 to size of total number of DPDG) PdtRunningTime$_{(o)}$=(DelayBudgetTime$_{(i)}$*DelayBud-get$_{Index}$)+(MaxTolerableDelayTime$_{(i)}$*MaxTol-erableDelay$_{Index}$)+(TotalPktInUPDG$_{(o)}$*TotalPktIn-Updg$_{Index}$), where PdtRunningTime$_{(o)}$ is the running time of PdcpDiscardTimer$_{(o)}$.

At step 813, the IPDCP handler starts the PDT. By way of example, in some embodiments, the IPDCP handler determines the RT of the PDT as follows:

In a loop o<(size of total number of created DPDG in step 5), where o=0 to size of total number of DPDG) Start PdcpDiscardTimer$_{(o)}$ with running rime of Pdt-RunningTime$_{(o)}$ to expire.

At step 807, the IPDCP handler and the IRLC handler discards data packets. The discarding of data packets of a DPDG (DataPacketDiscardGroup$_{(o)}$) triggers upon expiry of an associated PDT (PdtRunningTime$_{(o)}$). In some embodiments, the discarding of data packets includes the steps of discarding data packets, belonging to a DPDG associated with PDT, from the PDCP transmit buffers (PTB's) at step 814, sending an internal control message (ICM) to the IRLC handler at step 815, and discarding data packets, belonging to a DPDG associated with PDT, from the RLC transmit buffers (RTB's) at step 816. Each of these steps will be described in greater detail herein below.

At step 814, the IPDCP handler discards data packets in PTB. The IPDCP handler creates a list of data packets (DataPacketListInDPDG$_{(o)}$) in DPDG (DataPacketDiscard-Group$_{(o)}$) using a sequence number of data packets of the associated DPDG (DataPacketDiscardGroup$_{(o)}$). The IPDCP handler then marks a current time stamp (CurTime). The IPDCP handler then discards data packets in the list (DataPacketListInDPDG$_{(o)}$) from PTB for data packets having receive time stamp less than (CurTime−DelayBudget-Time$_{(i)}$).

At step 815, the IPDCP handler sends the ICM to the IRLC handler. The IPDCP handler creates the ICM using the list (DataPacketListInUPDG$_{(o)}$) for the data packets associated to the list (DataPacketListInUPDG$_{(o)}$) and sends the same to the IRLC handler. At step 816, IRLC handler discards the data packets in the RTB based on the list of data packets referenced in the ICM. It should be noted that the control logic 800 iterates the steps 805 through 807 till a desired or a required number of data packets are transmitted. Thus, steps 805 through 807 are repeated for further data packets discard for data packets in the PTB and the RTB.

Thus, the techniques described in the embodiments discussed above provide for efficient data packets processing for data transmission in the communication network. As discussed in step 805, this may be enabled, by the IPDCP handler and the IRLC handler, by determination and allocation of allowable (i.e., limited) number of simultaneously active data packets discard timers based on data packet discard grouping to be maintained in the IPDCP at any given moment. Such determination and allocation of simultaneously active data packets discard timers based on data packet discard grouping adequately addresses the issues of PDCP buffer (PTB) overflow and processing overhead on the eNB. As discussed above, the determination and allocation of simultaneously active data packets discard timers may be achieved by allocation of delay budget timer (DBT) to group of incoming user packets based on service type (ex. QCI) across UE's. Further, the determination and allocation of simultaneously active data packets discard timers may be achieved by formation of data packet discard groups (DP-DG's) based on service category (represented by QCI), varying state of RTBO for RB, and maximum number of data packets in DPDG. Additionally, the determination and allocation of simultaneously active data packets discard timers may be achieved by allocation of PDT for each DPDG with dynamically determined running time (RT).

It should be noted that the running time (RT) of active PDTs for data packet discard group may be dynamically determined in order to cater to dynamically varying data packet load, while maintaining desired data packet processing so as to adequately address the issues of PDCP buffer overflow and processing overhead of the eNB. As discussed in step 806, the RT value for a PDT may be dynamically determined based on a total number of data packet present in a DPDG, time delay budget (TDB) of a service category (represented by QCI), and maximum tolerable delay (MTD) for TDB of a service category.

Further, the techniques described in the embodiments discussed above provide for optimization of ICM to the IRLC handler for data packet discard, thereby reducing ICM communication overhead. As discussed in step 806, this may be enabled, by the IPDCP handler, by forming the ICM using the sequence number of packets of the associated DPDG, and sending the same to the IRLC handler for RLC SDU discard.

As will be appreciated, for the uplink, the UE performs processing of data packets via a process substantially similar to the above described process performed by the base station (i.e., eNB) for downlink. Thus, the data packet transmission protocol (DPTP) having DPTP packet discard timers (DP-DT's) in the UE may implement as well as perform above described techniques for effective discard of data packets for data transmission. For example, an IPDCP handler, an IRLC handler, a MAC handler, and a PHY handler in the UE will process data packets for data transmission via a process substantially similar to the above described process. It should be noted that, for uplink, the configuration parameters may be provided to the UE by the base station (e.g., eNB). The UE may then configure itself (e.g., IPDCP handler, IRLC handler, etc.) based on the received configuration parameters. The UE may then perform processing of data packets for effective discard of data packets.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
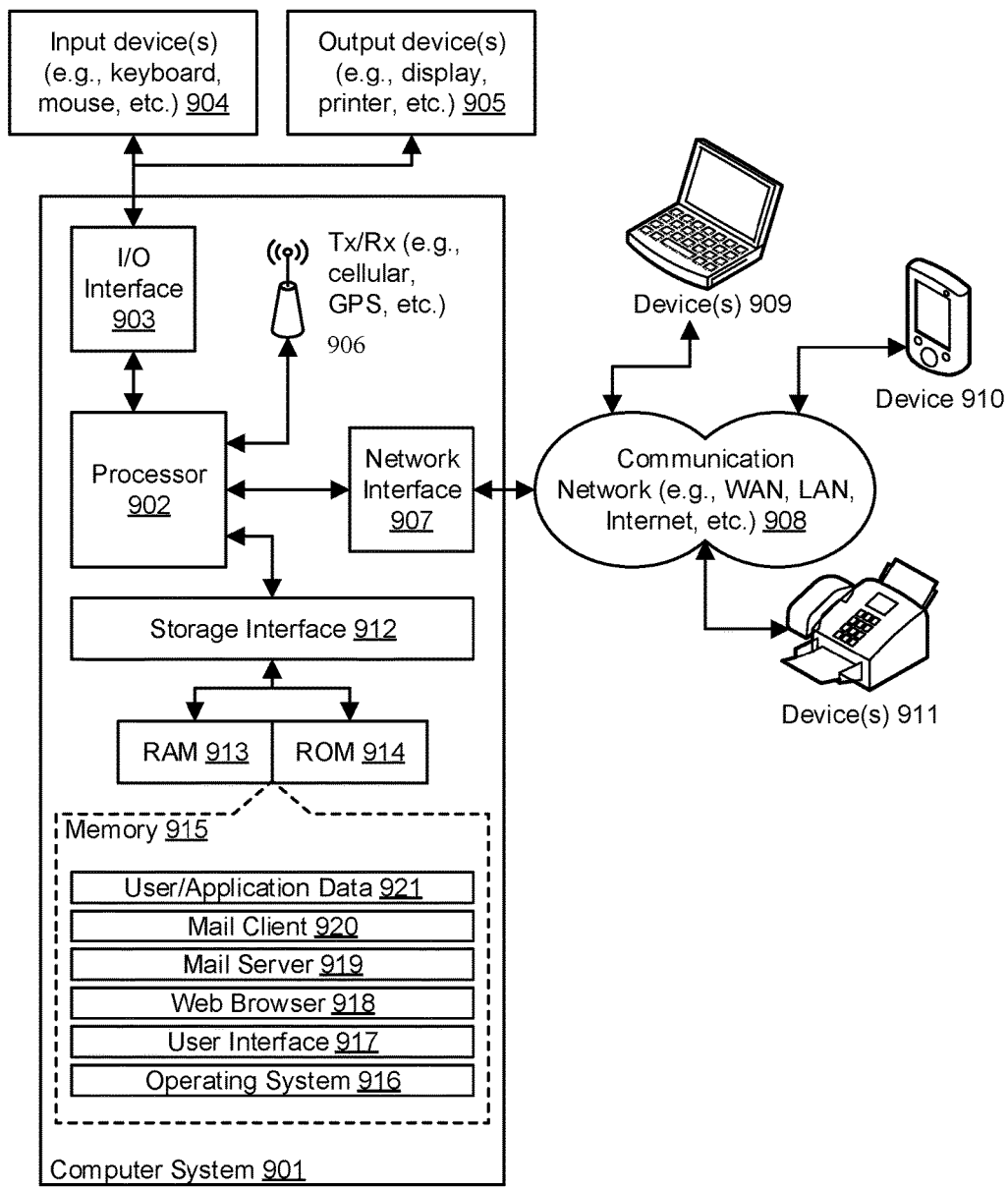
FIG. 9 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, a block diagram of an exemplary computer system 901 for implementing embodiments consistent with the present disclosure is illustrated. Variations of computer system 901 may be used for implementing components of communication network 100, the eNB 200, and various components of eNB 300, 400, 500, 600 for processing data packets for transmission in the communication network. Computer system 901 may include a central processing unit ("CPU" or "processor") 902. Processor 902 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 902 may be implemented using mainframe, distributed processor, multi-core, parallel, grid, or other architectures. Some embodiments may utilize embedded technologies likeapplication-specific integrated circuits (ASICs), digital signal processors (DSPs), Field Programmable Gate Arrays (FPGAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 908 via a network interface 907. The network interface 907 may communicate with the communication network 908. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 908 may include, without limitation, a direct interconnection, local area network (LAN), wide area network (WAN), wireless network (e.g., using Wireless Application Protocol), the Internet, etc. Using the network interface 907 and the communication network 908, the computer system 901 may communicate with devices 909, 910, and 911. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 901 may itself embody one or more of these devices.

In some embodiments, the processor 902 may be disposed in communication with one or more memory devices (e.g., RAM 913, ROM 914, etc.) via a storage interface 912. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 916, user interface application 917, web browser 918, mail server 919, mail client 920, user/application data 921 (e.g., any data variables or data records discussed in this disclosure), etc. The operating system 916 may facilitate resource management and operation of the computer system 901. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 917 may facilitate display, execution, interaction, manipulation, or operation of program components through textual or graphical facilities. For example, user interfaces may provide computer interaction interface elements on a display system operatively connected to the computer system 901, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 901 may implement a web browser 918 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 901 may implement a mail server 919 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 901 may implement a mail client 920 stored program component. The mail client may be a mail viewing application, such as Apple Mail, Microsoft Entourage, Microsoft Outlook, Mozilla Thunderbird, etc.

In some embodiments, computer system 901 may store user/application data 921, such as the data, variables, records, etc. (e.g., user data, control data, configuration data, DPDG's, DPDT's, RT's, QCI, DBT, MTD, minimum number of RTBO categories, number of RB index, RLC buffer size index, DPDG total packet index, DBT index, MTD index, average RTBO index, service category, state of RTBO, maximum number of data packets in each DPDG, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques, described in the various embodiments discussed above, provide for efficient data packets processing for data transmission in the communication network. The techniques provide for an improved network device (e.g., base station, or UE) with improved data subsystem and/or improved data transmission protocols (e.g., PDCP, PDP, RLC) for effective discard of data packets during data transmission. Thus, the techniques provide for an efficient and effective PDT maintenance and allocation to data-packets in the network device at any given time in order to achieve resource utilization (e.g., PTB buffers, RTB buffers, air interface bandwidth, and processing-capacity) while maintaining UE service quality by minimizing packet-drop and transmission of irrelevant or redundant data packet through the air interface.

It should be noted that running a PDCP discard timer per data packet and discarding the data packet one by one, as per existing techniques, added to the system overhead, resulted in processing delay, and failed to maintain the uniform time delay budget for RLC SDU discard. These issues compounded in case high data throughput. Further, it should be noted that employment of less number of PDT's as compared to incoming data packet load typically resulted in rejection of data packets. As will be appreciated, the techniques, described in the various embodiments discussed above, provide for optimizing (i.e., limiting) a number of PDT's in the PDCP so as to address the issue of PDCP buffer overflow, accumulated pending packet processing overhead, and PDT maintenance processing overhead. Further, as will be appreciated, the techniques provide for optimization of PDT's without resulting in rejection of data packets.

The specification has described system and method for processing data packets for transmission in a communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for processing data packets for transmission in a wireless communication network, the method comprising:
    dynamically creating, by a network device, a plurality of data packet discard groups (DPDG's), wherein each of the created plurality of DPDG's comprises a plurality of data packets;
    determining, by the network device, a plurality of simultaneously active data packet transmission protocol (DPTP) packet discard timers (DPDT's) corresponding to the plurality of DPDG's; and
    assigning, by the network device, each of the plurality of simultaneously active DPDT's to each of the plurality of DPDG's, wherein the assignment of each of the plurality of simultaneously active DPDT's triggers upon expiry of a running delay budget timer (DBT) or an already running packet data convergence protocol (PDCP) discard timer (PDT); and
    discarding, by the network device, the plurality of data packets associated with each of the plurality of DPDG's on expiry of the corresponding DPDT.

2. The method of claim 1, further comprising initializing, by the network device, with a plurality of configuration parameters, wherein the plurality of configuration parameters comprise one or more of: a quality class indicator (QCI), a delay budget timer (DBT), a maximum tolerable delay (MTD), a minimum number of radio link control (RLC) transmit buffer occupancy (RTBO) categories, a number of radio bearer (RB) index, a RLC buffer size index, a DPDG total packet index, a DBT index, a MTD index, and an average RTBO index.

3. The method of claim 1, further comprising allocating, by the network device, a delay budget timer (DBT) to the plurality of data packets based on a service category.

4. The method of claim 1, wherein:
    the plurality of DPDG's is dynamically created based on a service category, a state of RLC transmit buffer occupancy (RTBO), or a maximum number of data packets in each of the DPDG; or
    the DPTP corresponds to the packet data convergence protocol (PDCP) and the DPDT corresponds to the PDT,
    wherein PDT is associated with a data packet and the DPDT is associated with DPDG by virtue of the assignment, and
    wherein the plurality of simultaneously active DPDT's are configured to be activated simultaneously with respect to each other.

5. The method of claim 1, further comprising:
    dynamically determining, by the network device, a plurality of running times (RT's) corresponding to the plurality of DPDT's, wherein the plurality of RT's is dynamically determined based on a number of data packets present in each of the plurality of DPDG's, a time delay budget (TDB) of a service category, or a maximum tolerable delay (MTB) for TDB of a service category; and
    assigning, by the network device, each of the plurality of RT's to each of the plurality of DPDG's.

6. The method of claim 1, further comprising optimizing, by the network device, an internal control message (ICM) for each of the plurality of DPDG's by generating the ICM based on a sequence number of data packets in the corresponding DPDG.

7. A system for processing data packets for transmission in a wireless communication network, the system comprising:
    at least one processor; and
    a memory storing instructions that, when executed by the at least one processor, cause the at least one processor to perform operations comprising:
        dynamically creating a plurality of data packet discard groups (DPDG's), wherein each of the created plurality of DPDG's comprises a plurality of data packets;
        determining a plurality of simultaneously active data packet transmission protocol (DPTP) packet discard timers (DPDT's) corresponding to the plurality of DPDG's; and
        assigning each of the plurality of simultaneously active DPDT's to each of the plurality of DPDG's, wherein the assignment of each of the plurality of simultaneously active DPDT's triggers upon expiry of a running delay budget timer (DBT) or an already running packet data convergence protocol (PDCP) discard timer (PDT); and
        discarding, by the network device, the plurality of data packets associated with each of the plurality of DPDG's on expiry of the corresponding DPDT.

8. The system of claim 7, wherein the instructions when executed by the at least one processor further cause the at least one processor to perform one or more additional operations comprising initializing with a plurality of configuration parameters, wherein the plurality of configuration parameters comprise one or more of: a quality class indicator (QCI), a delay budget timer (DBT), a maximum tolerable delay (MTD), a minimum number of radio link control (RLC) transmit buffer occupancy (RTBO) categories, a number of radio bearer (RB) index, a RLC buffer size index, a DPDG total packet index, a DBT index, a MTD index, and an average RTBO index.

9. The system of claim 7, wherein the instructions when executed by the at least one processor further cause the at least one processor to perform one or more additional operations comprising allocating a delay budget timer (DBT) to the plurality of data packets based on a service category.

10. The system of claim 7, wherein:
the plurality of DPDG's is dynamically created based on a service category, a state of RLC transmit buffer occupancy (RTBO), or a maximum number of data packets in each of the DPDG; or
the DPTP corresponds to the packet data convergence protocol (PDCP) and the DPDT corresponds to the PDT,
wherein PDT is associated with a data packet and the DPDT is associated with DPDG by virtue of the assignment, and
wherein the plurality of simultaneously active DPDT's are configured to be activated simultaneously with respect to each other.

11. The system of claim 7, wherein the instructions when executed by the at least one processor further cause the at least one processor to perform one or more additional operations comprising:
dynamically determining a plurality of running times (RT's) corresponding to the plurality of DPDT's, wherein the plurality of RT's is dynamically determined based on a number of data packets present in each of the plurality of DPDG's, a time delay budget (TDB) of a service category, or a maximum tolerable delay (MTB) for TDB of a service category; and
assigning each of the plurality of RT's to each of the plurality of DPDG's.

12. The system of claim 7, wherein the instructions when executed by the at least one processor further cause the at least one processor to perform one or more additional operations comprising optimizing an internal control message (ICM) for each of the plurality of DPDG's by generating the ICM based on a sequence number of data packets in the corresponding DPDG.

13. A non-transitory computer-readable medium storing instructions for processing data packets for transmission in a wireless communication network, wherein upon execution of the instructions by one or more processors, causes the one or more processors to perform operations comprising:
dynamically creating a plurality of data packet discard groups (DPDG's), wherein each of the created plurality of DPDG's comprises a plurality of data packets;
determining a plurality of simultaneously active data packet transmission protocol (DPTP) packet discard timers (DPDT's) corresponding to the plurality of DPDG's; and
assigning each of the plurality of simultaneously active DPDT's to each of the plurality of DPDG's, wherein the assignment of each of the plurality of simultaneously active DPDT's triggers upon expiry of a running delay budget timer (DBT) or an already running packet data convergence protocol (PDCP) discard timer (PDT); and
discarding, by the network device, the plurality of data packets associated with each of the plurality of DPDG's on expiry of the corresponding DPDT.

14. The non-transitory computer-readable medium of claim 13, wherein upon execution of the instructions by the processors, the processor further perform one or more additional operations comprising initializing with a plurality of configuration parameters, wherein the plurality of configuration parameters comprise one or more of: a quality class indicator (QCI), a delay budget timer (DBT), a maximum tolerable delay (MTD), a minimum number of radio link control (RLC) transmit buffer occupancy (RTBO) categories, a number of radio bearer (RB) index, a RLC buffer size index, a DPDG total packet index, a DBT index, a MTD index, and an average RTBO index.

15. The non-transitory computer-readable medium of claim 13, wherein upon execution of the instructions by the processors, the processor further perform one or more additional operations comprising allocating a delay budget timer (DBT) to the plurality of data packets based on a service category.

16. The non-transitory computer-readable medium of claim 13, wherein:
the plurality of DPDG's is dynamically created based on a service category, a state of RLC transmit buffer occupancy (RTBO), or a maximum number of data packets in each of the DPDG; or
the DPTP corresponds to the packet data convergence protocol (PDCP) and the DPDT corresponds to the PDT,
wherein PDT is associated with a data packet and the DPDT is associated with DPDG by virtue of the assignment, and
wherein the plurality of simultaneously active DPDT's are configured to be activated simultaneously with respect to each other.

17. The non-transitory computer-readable medium of claim 13, wherein upon execution of the instructions by the processors, the processor further perform one or more additional operations comprising:
dynamically determining a plurality of running times (RT's) corresponding to the plurality of DPDT's, wherein the plurality of RT's is dynamically determined based on a number of data packets present in each of the plurality of DPDG's, a time delay budget (TDB) of a service category, or a maximum tolerable delay (MTB) for TDB of a service category; and
assigning each of the plurality of RT's to each of the plurality of DPDG's.

18. The non-transitory computer-readable medium of claim 13, wherein upon execution of the instructions by the processors, the processor further perform one or more additional operations comprising optimizing an internal control message (ICM) for each of the plurality of DPDG's by generating the ICM based on a sequence number of data packets in the corresponding DPDG.

* * * * *